US009011662B2

(12) United States Patent
Wang et al.

(10) Patent No.: US 9,011,662 B2
(45) Date of Patent: Apr. 21, 2015

(54) DROPLET ACTUATOR ASSEMBLIES AND METHODS OF MAKING SAME

(75) Inventors: Tih-Hong Wang, Cary, NC (US); George Brackett, Franklinton, NC (US); David Clevenger, Durham, NC (US); Donovan E. Bort, Apex, NC (US)

(73) Assignee: Advanced Liquid Logic, Inc., San Diego, CA (US)

( * ) Notice: Subject to any disclaimer, the term of this patent is extended or adjusted under 35 U.S.C. 154(b) by 206 days.

(21) Appl. No.: 13/807,812

(22) PCT Filed: Jun. 24, 2011

(86) PCT No.: PCT/US2011/041761

§ 371 (c)(1),
(2), (4) Date: Mar. 18, 2013

(87) PCT Pub. No.: WO2012/012090

PCT Pub. Date: Jan. 26, 2012

(65) Prior Publication Data

US 2013/0206597 A1 Aug. 15, 2013

Related U.S. Application Data

(60) Provisional application No. 61/360,034, filed on Jun. 30, 2010, provisional application No. 61/479,610, filed on Apr. 27, 2011.

(51) Int. Cl.
*G01N 27/447* (2006.01)
*B01L 3/02* (2006.01)
(Continued)

(52) U.S. Cl.
CPC ......... *B01L 3/0241* (2013.01); *B01L 3/502784* (2013.01); *B41J 2/14024* (2013.01)

(58) Field of Classification Search
CPC ................................ B01L 3/502784–3/502792
USPC .................................................. 204/450, 600
See application file for complete search history.

(56) References Cited

U.S. PATENT DOCUMENTS 4,636,785 A 1/1987 Le Pesant
5,181,016 A 1/1993 Lee
(Continued)

FOREIGN PATENT DOCUMENTS

JP 2006329899 A 12/2006
JP 2006329904 A 12/2006
(Continued)

OTHER PUBLICATIONS

Benton et al., "Library Preparation Method 1 DNA Library Construction for Illumine SBS Sequencing Platforms using NEBNext® Library Preparation Reagents", Application Note, NuGEN, 2011.
(Continued)

*Primary Examiner* — Alex Noguerola
(74) *Attorney, Agent, or Firm* — William A. Barrett; Ward & Smith, P.A.

(57) ABSTRACT

The invention provides droplet actuator assemblies and systems and methods of manufacturing the droplet actuator assemblies. In certain embodiments, two-piece enclosures are used to form a droplet actuator assembly that houses a droplet operations substrate. In certain other embodiments, one-piece enclosures are used to form a droplet actuator assembly that houses a droplet operations substrate. In the plastic injection molding process for forming substrates of the droplet actuator assemblies of the present invention may utilize insert molding (or overmolding) processes for forming a gasket in at least one substrate, thereby avoiding the need for providing and installing a separate gasket component. Further, the droplet actuator assemblies may include features that allow ultrasonic welding processes to be used for bonding substrates together. The manufacturing systems of the present invention for fabricating the droplet actuator assemblies may utilize continuous flow reel-to-reel manufacturing processes.

12 Claims, 16 Drawing Sheets

(51) Int. Cl.
*B41J 2/14* (2006.01)
*B01L 3/00* (2006.01)

(56) References Cited

U.S. PATENT DOCUMENTS

| | | | |
|---|---|---|---|
| 5,486,337 | A | 1/1996 | Ohkawa |
| 6,063,339 | A | 5/2000 | Tisone et al. |
| 6,130,098 | A | 10/2000 | Handique et al. |
| 6,294,063 | B1 | 9/2001 | Becker et al. |
| 6,379,988 | B1 | 4/2002 | Peterson et al. |
| 6,384,353 | B1 | 5/2002 | Huang et al. |
| 6,565,727 | B1 | 5/2003 | Shenderov |
| 6,773,566 | B2 | 8/2004 | Shenderov |
| 6,790,011 | B1 | 9/2004 | Le Pesant et al. |
| 6,911,132 | B2 | 6/2005 | Pamula et al. |
| 6,924,792 | B1 | 8/2005 | Jessop |
| 6,977,033 | B2 | 12/2005 | Becker et al. |
| 6,989,234 | B2 | 1/2006 | Kolar et al. |
| 7,052,244 | B2 | 5/2006 | Fouillet et al. |
| 7,163,612 | B2 | 1/2007 | Sterling et al. |
| 7,211,223 | B2 | 5/2007 | Fouillet e |
| 7,255,780 | B2 | 8/2007 | Shenderov |
| 7,328,979 | B2 | 2/2008 | Decre et al. |
| 7,329,545 | B2 | 2/2008 | Pamula et al. |
| 7,439,014 | B2 | 10/2008 | Pamula et al. |
| 7,458,661 | B2 | 12/2008 | Kim et al. |
| 7,531,072 | B2 | 5/2009 | Roux et al. |
| 7,547,380 | B2 | 6/2009 | Velev |
| 7,569,129 | B2 | 8/2009 | Pamula et al. |
| 7,641,779 | B2 | 1/2010 | Becker et al. |
| 7,727,466 | B2 | 6/2010 | Meathrel et al. |
| 7,727,723 | B2 | 6/2010 | Pollack et al. |
| 7,759,132 | B2 | 7/2010 | Pollack et al. |
| 7,763,471 | B2 | 7/2010 | Pamula et al. |
| 7,815,871 | B2 | 10/2010 | Pamula et al. |
| 7,816,121 | B2 | 10/2010 | Pollack et al. |
| 7,822,510 | B2 | 10/2010 | Paik et al. |
| 7,851,184 | B2 | 12/2010 | Pollack et al. |
| 7,875,160 | B2 | 1/2011 | Jary |
| 7,901,947 | B2 | 3/2011 | Pollack et al. |
| 7,919,330 | B2 | 4/2011 | De Guzman et al. |
| 7,922,886 | B2 | 4/2011 | Fouillet et al. |
| 7,939,021 | B2 | 5/2011 | Smith et al. |
| 7,943,030 | B2 | 5/2011 | Shenderov |
| 7,989,056 | B2 | 8/2011 | Plissonnier et al. |
| 7,998,436 | B2 | 8/2011 | Pollack et al. |
| 8,007,739 | B2 | 8/2011 | Pollack et al. |
| 8,041,463 | B2 | 10/2011 | Pollack et al. |
| 8,048,628 | B2 | 11/2011 | Pollack et al. |
| 8,075,754 | B2 | 12/2011 | Sauter-Starace et al. |
| 8,088,578 | B2 | 1/2012 | Hua et al. |
| 8,093,062 | B2 | 1/2012 | Winger et al. |
| 8,093,064 | B2 | 1/2012 | Shah et al. |
| 8,137,917 | B2 | 3/2012 | Pollack et al. |
| 8,147,668 | B2 | 4/2012 | Pollack et al. |
| 8,202,686 | B2 | 6/2012 | Pamula et al. |
| 8,208,146 | B2 | 6/2012 | Srinivasan et al. |
| 8,221,605 | B2 | 7/2012 | Pollack et al. |
| 8,236,156 | B2 | 8/2012 | Sarrut et al. |
| 8,268,246 | B2 | 9/2012 | Srinivasan et al. |
| 8,287,711 | B2 | 10/2012 | Pollack et al. |
| 8,304,253 | B2 | 11/2012 | Yi et al. |
| 8,313,698 | B2 | 11/2012 | Pollack et al. |
| 8,317,990 | B2 | 11/2012 | Pamula et al. |
| 8,342,207 | B2 | 1/2013 | Raccurt et al. |
| 8,349,276 | B2 | 1/2013 | Pamula et al. |
| 8,364,315 | B2 | 1/2013 | Sturmer et al. |
| 8,388,909 | B2 | 3/2013 | Pollack et al. |
| 8,389,297 | B2 | 3/2013 | Pamula et al. |
| 8,394,249 | B2 | 3/2013 | Pollack et al. |
| 8,394,641 | B2 | 3/2013 | Winger |
| 8,426,213 | B2 | 4/2013 | Eckhardt et al. |
| 8,440,392 | B2 | 5/2013 | Pamula et al. |
| 8,444,836 | B2 | 5/2013 | Fouillet et al. |
| 2002/0005354 | A1 | 1/2002 | Spence et al. |
| 2002/0036139 | A1 | 3/2002 | Becker et al. |
| 2002/0043463 | A1 | 4/2002 | Shenderov |
| 2002/0058332 | A1 | 5/2002 | Quake et al. |
| 2002/0143437 | A1 | 10/2002 | Handique et al. |
| 2002/0195478 | A1 | 12/2002 | Yamano et al. |
| 2003/0029543 | A1 | 2/2003 | Gotoh et al. |
| 2003/0164295 | A1 | 9/2003 | Sterling |
| 2003/0183525 | A1 | 10/2003 | Elrod et al. |
| 2003/0205632 | A1 | 11/2003 | Kim et al. |
| 2004/0031688 | A1 | 2/2004 | Shenderov |
| 2004/0055891 | A1 | 3/2004 | Pamula et al. |
| 2004/0058450 | A1 | 3/2004 | Pamula et al. |
| 2004/0080566 | A1 | 4/2004 | Silverbrook |
| 2004/0231987 | A1 | 11/2004 | Sterling et al. |
| 2006/0021875 | A1 | 2/2006 | Griffith et al. |
| 2006/0054503 | A1 | 3/2006 | Pamula et al. |
| 2006/0139409 | A1 | 6/2006 | Matsushita et al. |
| 2006/0164490 | A1 | 7/2006 | Kim et al. |
| 2006/0194331 | A1 | 8/2006 | Pamula et al. |
| 2006/0231398 | A1 | 10/2006 | Sarrut et al. |
| 2007/0023292 | A1 | 2/2007 | Kim et al. |
| 2007/0037294 | A1 | 2/2007 | Pamula et al. |
| 2007/0045117 | A1 | 3/2007 | Pamula et al. |
| 2007/0064990 | A1 | 3/2007 | Roth |
| 2007/0086927 | A1 | 4/2007 | Natarajan et al. |
| 2007/0207513 | A1 | 9/2007 | Sorensen et al. |
| 2007/0217956 | A1 | 9/2007 | Pamula et al. |
| 2007/0241068 | A1 | 10/2007 | Pamula et al. |
| 2007/0242105 | A1 | 10/2007 | Srinivasan et al. |
| 2007/0242111 | A1 | 10/2007 | Pamula et al. |
| 2007/0243634 | A1 | 10/2007 | Pamula et al. |
| 2007/0267294 | A1 | 11/2007 | Shenderov |
| 2007/0275415 | A1 | 11/2007 | Srinivasan et al. |
| 2008/0006535 | A1 | 1/2008 | Paik et al. |
| 2008/0038810 | A1 | 2/2008 | Pollack et al. |
| 2008/0044893 | A1 | 2/2008 | Pollack et al. |
| 2008/0044914 | A1 | 2/2008 | Pamula et al. |
| 2008/0050834 | A1 | 2/2008 | Pamula et al. |
| 2008/0053205 | A1 | 3/2008 | Pollack et al. |
| 2008/0105549 | A1 | 5/2008 | Pamela et al. |
| 2008/0124252 | A1 | 5/2008 | Marchand et al. |
| 2008/0142376 | A1 | 6/2008 | Fouillet et al. |
| 2008/0151240 | A1 | 6/2008 | Roth |
| 2008/0210558 | A1 | 9/2008 | Sauter-Starace et al. |
| 2008/0247920 | A1 | 10/2008 | Pollack et al. |
| 2008/0264797 | A1 | 10/2008 | Pamula et al. |
| 2008/0274513 | A1 | 11/2008 | Shenderov et al. |
| 2008/0281471 | A1 | 11/2008 | Smith et al. |
| 2008/0283414 | A1 | 11/2008 | Monroe et al. |
| 2008/0302431 | A1 | 12/2008 | Marchand et al. |
| 2008/0305481 | A1 | 12/2008 | Whitman et al. |
| 2009/0014394 | A1 | 1/2009 | Yi et al. |
| 2009/0042319 | A1 | 2/2009 | De Guzman et al. |
| 2009/0127123 | A1 | 5/2009 | Raccurt et al. |
| 2009/0134027 | A1 | 5/2009 | Jary |
| 2009/0142564 | A1 | 6/2009 | Plissonnier et al. |
| 2009/0155902 | A1 | 6/2009 | Pollack et al. |
| 2009/0192044 | A1 | 7/2009 | Fouillet |
| 2009/0260988 | A1 | 10/2009 | Pamula et al. |
| 2009/0263834 | A1 | 10/2009 | Sista et al. |
| 2009/0280251 | A1 | 11/2009 | De Guzman et al. |
| 2009/0280475 | A1 | 11/2009 | Pollack et al. |
| 2009/0280476 | A1 | 11/2009 | Srinivasan et al. |
| 2009/0283407 | A1 | 11/2009 | Shah et al. |
| 2009/0288710 | A1 | 11/2009 | Viovy et al. |
| 2009/0291433 | A1 | 11/2009 | Pollack et al. |
| 2009/0304944 | A1 | 12/2009 | Sudarsan et al. |
| 2009/0311713 | A1 | 12/2009 | Pollack et al. |
| 2009/0321262 | A1 | 12/2009 | Adachi et al. |
| 2010/0025242 | A1 | 2/2010 | Pamula et al. |
| 2010/0025250 | A1 | 2/2010 | Pamula et al. |
| 2010/0028920 | A1 | 2/2010 | Eckhardt |
| 2010/0032293 | A1 | 2/2010 | Pollack et al. |
| 2010/0041086 | A1 | 2/2010 | Pamula et al. |
| 2010/0048410 | A1 | 2/2010 | Shenderov et al. |
| 2010/0062508 | A1 | 3/2010 | Pamula et al. |
| 2010/0068764 | A1 | 3/2010 | Sista et al. |
| 2010/0087012 | A1 | 4/2010 | Shenderov |
| 2010/0096266 | A1 | 4/2010 | Kim et al. |

(56) References Cited

U.S. PATENT DOCUMENTS

| | | | | |
|---|---|---|---|---|
| 2010/0116640 | A1 | 5/2010 | Pamula et al. | |
| 2010/0118307 | A1 | 5/2010 | Srinivasan et al. | |
| 2010/0120130 | A1 | 5/2010 | Srinivasan et al. | |
| 2010/0126860 | A1 | 5/2010 | Srinivasan et al. | |
| 2010/0130369 | A1 | 5/2010 | Shenderov et al. | |
| 2010/0140093 | A1 | 6/2010 | Pamula et al. | |
| 2010/0143963 | A1 | 6/2010 | Pollack et al. | |
| 2010/0151439 | A1 | 6/2010 | Pamula et al. | |
| 2010/0190263 | A1 | 7/2010 | Srinivasan et al. | |
| 2010/0194408 | A1 | 8/2010 | Sturmer et al. | |
| 2010/0208328 | A1* | 8/2010 | Heikenfeld et al. | 359/290 |
| 2010/0221713 | A1 | 9/2010 | Pollack et al. | |
| 2010/0232028 | A1* | 9/2010 | Takai | 359/626 |
| 2010/0236927 | A1 | 9/2010 | Pope et al. | |
| 2010/0236928 | A1 | 9/2010 | Srinivasan et al. | |
| 2010/0236929 | A1 | 9/2010 | Pollack et al. | |
| 2010/0258441 | A1 | 10/2010 | Sista et al. | |
| 2010/0270156 | A1 | 10/2010 | Srinivasan et al. | |
| 2010/0279374 | A1 | 11/2010 | Sista et al. | |
| 2010/0282608 | A1 | 11/2010 | Srinivasan et al. | |
| 2010/0282609 | A1 | 11/2010 | Pollack et al. | |
| 2010/0307917 | A1 | 12/2010 | Srinivasan et al. | |
| 2010/0320088 | A1 | 12/2010 | Fouillet et al. | |
| 2010/0323405 | A1 | 12/2010 | Pollack et al. | |
| 2011/0076692 | A1 | 3/2011 | Sista et al. | |
| 2011/0086377 | A1 | 4/2011 | Thwar et al. | |
| 2011/0091989 | A1 | 4/2011 | Sista et al. | |
| 2011/0097763 | A1 | 4/2011 | Pollack et al. | |
| 2011/0100823 | A1 | 5/2011 | Pollack et al. | |
| 2011/0104725 | A1 | 5/2011 | Pamula et al. | |
| 2011/0104747 | A1 | 5/2011 | Pollack et al. | |
| 2011/0104816 | A1 | 5/2011 | Pollack et al. | |
| 2011/0114490 | A1 | 5/2011 | Pamula et al. | |
| 2011/0118132 | A1 | 5/2011 | Winger et al. | |
| 2011/0147215 | A1 | 6/2011 | Fuchs et al. | |
| 2011/0180571 | A1 | 7/2011 | Srinivasan et al. | |
| 2011/0186433 | A1 | 8/2011 | Pollack et al. | |
| 2011/0203930 | A1 | 8/2011 | Pamula et al. | |
| 2011/0209998 | A1 | 9/2011 | Shenderov | |
| 2011/0213499 | A1 | 9/2011 | Sturmer et al. | |
| 2011/0303542 | A1 | 12/2011 | Srinivasan et al. | |
| 2011/0311980 | A1 | 12/2011 | Pollack et al. | |
| 2012/0018306 | A1 | 1/2012 | Srinivasan et al. | |
| 2012/0044299 | A1 | 2/2012 | Winger | |
| 2012/0132528 | A1 | 5/2012 | Shenderov et al. | |
| 2012/0136147 | A1 | 5/2012 | Winger | |
| 2012/0165238 | A1 | 6/2012 | Pamula et al. | |
| 2013/0059366 | A1 | 3/2013 | Pollack et al. | |

FOREIGN PATENT DOCUMENTS

| | | | |
|---|---|---|---|
| WO | 00/69565 | A1 | 11/2000 |
| WO | 00/73655 | A1 | 12/2000 |
| WO | 01/56920 | | 8/2001 |
| WO | 2004029585 | A1 | 4/2004 |
| WO | 2004030820 | | 4/2004 |
| WO | 2005047696 | A1 | 5/2005 |
| WO | 2006013303 | A1 | 2/2006 |
| WO | 2006070162 | A1 | 7/2006 |
| WO | 2006081558 | | 8/2006 |
| WO | 2006124458 | A2 | 11/2006 |
| WO | 2006127451 | A2 | 11/2006 |
| WO | 2006134307 | A1 | 12/2006 |
| WO | 2006138543 | | 12/2006 |
| WO | 2007003720 | A1 | 1/2007 |
| WO | 2007012638 | A1 | 2/2007 |
| WO | 2007033990 | A1 | 3/2007 |
| WO | 2007048111 | | 4/2007 |
| WO | 2007120240 | A2 | 10/2007 |
| WO | 2007120241 | A2 | 10/2007 |
| WO | 2007123908 | A2 | 11/2007 |
| WO | 2008051310 | A2 | 5/2008 |
| WO | 2008055256 | A3 | 5/2008 |
| WO | 2008068229 | A1 | 6/2008 |
| WO | 2008091848 | A2 | 7/2008 |
| WO | 2008098236 | A2 | 8/2008 |
| WO | 2008101194 | A2 | 8/2008 |
| WO | 2008106678 | A1 | 9/2008 |
| WO | 2008109664 | A1 | 9/2008 |
| WO | 2008112856 | A1 | 9/2008 |
| WO | 2008116209 | A1 | 9/2008 |
| WO | 2008116221 | A1 | 9/2008 |
| WO | 2008118831 | A2 | 10/2008 |
| WO | 2008124846 | A2 | 10/2008 |
| WO | 2008131420 | A2 | 10/2008 |
| WO | 2008134153 | A1 | 11/2008 |
| WO | 2009002920 | A1 | 12/2008 |
| WO | 2009003184 | A1 | 12/2008 |
| WO | 2009011952 | A1 | 1/2009 |
| WO | 2009021173 | A1 | 2/2009 |
| WO | 2009021233 | A2 | 2/2009 |
| WO | 2009026339 | A2 | 2/2009 |
| WO | 2009029561 | A2 | 3/2009 |
| WO | 2009032863 | A2 | 3/2009 |
| WO | 2009052095 | A1 | 4/2009 |
| WO | 2009052123 | A2 | 4/2009 |
| WO | 2009052321 | A2 | 4/2009 |
| WO | 2009052345 | | 4/2009 |
| WO | 2009052348 | A2 | 4/2009 |
| WO | 2009076414 | | 6/2009 |
| WO | 2009086403 | A2 | 7/2009 |
| WO | 2009111769 | A2 | 9/2009 |
| WO | 2009135205 | A2 | 11/2009 |
| WO | 2009137415 | A2 | 11/2009 |
| WO | 2009140373 | A2 | 11/2009 |
| WO | 2009140671 | A2 | 11/2009 |
| WO | 2010004014 | A1 | 1/2010 |
| WO | 2010006166 | A2 | 1/2010 |
| WO | 2010009463 | A2 | 1/2010 |
| WO | 2010019782 | A2 | 2/2010 |
| WO | 2010027894 | A2 | 3/2010 |
| WO | 2010042637 | A2 | 4/2010 |
| WO | 2010077859 | A3 | 7/2010 |
| WO | 2011002957 | A2 | 1/2011 |
| WO | 2011020011 | A2 | 2/2011 |
| WO | 2011057197 | A2 | 5/2011 |
| WO | 2011084703 | A2 | 7/2011 |
| WO | 2011126892 | A2 | 10/2011 |
| WO | 2012009320 | A2 | 1/2012 |
| WO | 2012012090 | A2 | 1/2012 |
| WO | 2012037308 | A2 | 3/2012 |
| WO | 2012068055 | A3 | 5/2012 |

OTHER PUBLICATIONS

Bottausci et al., "Fully Integrated EWOD Based Bio-Analysis Device", Labautomation 2011, Palm Springs Convention Center, Palm Springs, CA, USA; Abstract in Proceedings on line, poster distributed, Jan. 29-Feb. 2, 2011.

Burton et al., "Diagnosis of Fabry and Gaucher diseases from the Pilot Screening of Newborns for Lysosomal Storage Disorders in Illinois", APHL Newborn Screening and Genetic Testing Symposium, San Diego, 2011.

Chakrabarty, "Automated Design of Microfluidics-Based Biochips: connecting Biochemistry of Electronics CAD", IEEE International Conference on Computer Design, San Jose, CA, Oct. 1-4, 2006, 93-100.

Chakrabarty et al., "Design Automation Challenges for Microfluidics-Based Biochips", DTIP of MEMS & MOEMS, Montreux, Switzerland, Jun. 1-3, 2005.

Chakrabarty et al., "Design Automation for Microfluidics-Based Biochips", ACM Journal on Engineering Technologies in Computing Systems , 1(3), Oct. 2005, 186-223.

Chakrabarty, "Design, Testing, and Applications of Digital Microfluidics-Based Biochips", Proceedings of the 18th International Conf. On VLSI held jointly with 4th International Conf. On Embedded Systems Design (VLSID'05), IEEE, Jan. 3-7, 2005.

Chen et al., "Development of Mesoscale Actuator Device with Micro Interlocking Mechanism", J. Intelligent Material Systems and Structures, vol. 9, No. 4, Jun. 1998, pp. 449-457.

(56) References Cited

OTHER PUBLICATIONS

Chen et al., "Mesoscale Actuator Device with Micro Interlocking Mechanism", Proc. IEEE Micro Electro Mechanical Systems Workshop, Heidelberg, Germany, Jan. 1998, pp. 384-389.
Chen et al., "Mesoscale Actuator Device: Micro Interlocking Mechanism to Transfer Macro Load", Sensors and Actuators, vol. 73, Issues 1-2, Mar. 1999, pp. 30-36.
Cotten et al., "Digital Microfluidics: a novel platform for multiplexed detection of lysosomal storage diseases", Abstract # 3747.9. Pediatric Academic Society Conference, 2008.
Delapierre et al., "SmartDrop: An Integrated System from Sample Collection to Result using real-time PCR", 4th National Bio-Threat Conference, Dec. 7-9, 2010, New Orleans, LA, USA; Abstract in Proceedings, Poster presented at conference,.
Delattre, Movie in news on TF1 (at 12'45" Cyril Delattre), http://videos.tf1.fr/jtwe/zoom-sur-grenoble-6071525.html, 2009.
Delattre, Movie in talk show "C Dans l'air" (at 24" Cyril Delattre), http://www.france5.fr/c-dans-l-air/sante/bientot-vous-ne-serez-plus-malade-31721, 2009.
Delattre, Movie on Web TV — Cite des sciences (at 3'26" Cyril Delattre), http://www.universcience.tv/video-laboratoire-de-poche-793.html, 2009.
Delattre et al., "SmartDrop: an integrated system from sample preparation to analysis using real-time PCR", 10th International Symposium on Protection against Chemical and Biological Warfare Agents; Stockholm, Sweden; poster, Jun. 10, 2010.
Delattre et al., "SmartDrop: an integrated system from sample preparation to analysis using real-time PCR", 10th International Symposium on Protection against Chemical and Biological Warfare Agents; Stockholm, Sweden; Abstract,paper,, Jun. 8-11, 2010.
Delattre et al., "Towards an industrial fabrication process for electrowetting chip using standard MEMS Technology", µTAS2008, San Diego; poster presented, Oct 15, 2008.
Delattre et al., "Towards an industrial fabrication process for electrowetting chip using standard MEMS Technology", µTAS2008, San Diego; Abstract in proceedings, Oct. 13-16, 2008, 1696-1698.
Dewey, "Towards a Visual Modeling Approach to Designing Microelectromechanical System Transducers", Journal of Micromechanics and Microengineering, vol. 9, Dec. 1999, 332-340.
Dewey et al., "Visual modeling and design of microelectromechanical system tansducers", Microelectronics Journal, vol. 32, Apr. 2001, 373-381.
Eckhardt et al., "Development and validation of a single-step fluorometric assay for Hunter syndrome", APHL Newborn Screening and Genetic Testing Symposium, San Diego, 2011.
Emani et al., "Novel Microfluidic Platform for Point of Care Hypercoagulability Panel Testing", Circulation, vol. 122, 2010, A14693.
Fair et al., "A Micro- Watt Metal-Insulator-Solution-Transport (MIST) Device for Scalable Digital Bio-Microfluidic Systems", IEEE IEDM Technical Digest, 2001, 16.4.1—4.
Fair et al., "Advances in droplet-based bio lab-on-a-chip", BioChips 2003, Boston, 2003.
Fair et al., "Bead-Based and Solution-Based Assays Performed on a Digital Microfluidic Platform", Biomedical Engineering Society (BMES) Fall Meeting, Baltimore, MD, Oct. 1, 2005.
Fair, "Biomedical Applications of Electrowetting Systems", 5th International Electrowetting Workshop, Rochester, NY, May 31, 2006.
Fair et al., "Chemical and Biological Applications of Digital-Microfluidic Devices", IEEE Design & Test of Computers, vol. 24(1), Jan.-Feb. 2007, 10-24.
Fair et al., "Chemical and biological pathogen detection in a digital microfluidic platform", DARPA Workshop on Microfluidic Analyzers for DoD and National Security Applications, Keystone, CO, 2006.
Fair, "Digital microfluidics: is a true lab-on-a-chip possible?", Microfluid Nanofluid, vol. 3, Mar. 8, 2007, 245-281.
Fair, "Droplet-based microfluidic Genome sequencing", NHGRI PI's meeting, Boston, 2005.
Fair et al., "Electrowetting-based On-Chip Sample Processing for Integrated Microfluidics", IEEE Inter. Electron Devices Meeting (IEDM), 2003, 32.5.1-32.5.4.
Fair et al., "Integrated chemical/biochemical sample collection, pre-concentration, and analysis on a digital microfluidic lab-on-a-chip platform", Lab-on-a-Chip: Platforms, Devices, and Applications, Conf. 5591, SPIE Optics East, Philadelphia, Oct. 25-28, 2004.
Fair, "Scaling of Digital Microfluidic Devices for Picoliter Applications", the 6th International Electrowetting Meeting, Aug 20-22, 2008, p. 14.
Fouillet, "Bio-Protocol Integration in Digital Microfluidic Chips", the 6th International Electrowetting Meeting, Aug. 20-22, 2008, p. 15.
Fouillet et al., "Design and Validation of a Complex Generic Fluidic Microprocessor Based on EWOD Droplet for Biological Applications", 9th International Conference on Miniaturized Systems for Chem and Life Sciences, Boston, MA, Oct. 9-13, 2005, 58-60.
Fouillet et al., "Digital microfluidic design and optimization of classic and new fluidic functions for lab on a chip systems", Microfluid Nanofluid, vol. 4, 2008, 159-165.
Graham et al., "Development of Quality Control Spots for Lysosomal Storage Disorders under cGMP", APHL Newborn Screening and Genetic Testing Symposium, San Diego, 2011.
Hua et al., "Multiplexed real-time polymerase chain reaction on a digital microfluidic platform", Analytical Chemistry, vol. 82, No. 6, Mar. 15, 2010, Published on Web, Feb 12, 2010, 2310-2316.
Hua et al., "Rapid Detection of Methicillin-Resistant Staphylococcus Aureus (MRSA) Using Digital Microfluidics", 12th Intl Conference on Miniaturized Systems for Chemistry and Life Sciences, Proc. µTAS, Oct. 12-16, 2008.
Jary et al., "Development of complete analytical system for Environment and homeland security", 14th International Conference on Biodetection Technologies 2009, Technological Responses to Biological Threats, Baltimore, MD; Abstract in Proceedings, poster distributed at conference, Jun. 25-26, 2009, 663.
Jary et al., "SmartDrop, Microfluidics for Biology", Forum 4i 2009, Grenoble, France; Flyer distributed at booth, May 14, 2009.
Jun et al., "Valveless Pumping using Traversing Vapor Bubbles in Microchannels", J. Applied Physics, vol. 83, No. 11, Jun. 1998, pp. 5658-5664.
Kim et al., "MEMS Devices Based on the Use of Surface Tension", Proc. Int. Semiconductor Device Research Symposium (ISDRS'99), Charlottesville, VA, Dec. 1999, pp. 481-484.
Kim, "Microelectromechanical Systems (MEMS) at the UCLA Micromanufacturing Lab", Dig. Papers, Int. Microprocesses and Nanotechnology Conf. (MNC'98), Kyungju, Korea, Jul. 1998, pp. 54-55.
Kim et al., "Micromachines Driven by Surface Tension", AIAA 99/3800, 30th AIAA Fluid Dynamics Conference, Norfolk, VA, (Invited lecture), Jun. 1999, pp. 1-6.
Kleinert et al., "Electric Field Assisted Convective Assembly of Colloidal Crystal Coatings", Symposium MM: Evaporative Self Assembly of Polymers, Nanoparticles, and DNA, 2010 MRS Spring Meeting, San Francisco, CA., Apr. 6-8, 2010.
Kleinert et al., "Electric Field-Assisted Convective Assembly of Large-Domain Colloidal Crystals", the 82nd Colloid & Surface Science Symposium, ACS Division of Colloid & Surface Science, North Carolina State University, Raleigh, NC. www.colloids2008.org., Jun. 15-18, 2008.
Kleinert, "Electric-Field-Assisted Convective Assembly of Colloidal Crystal Coatings", Langmuir, vol. 26(12), May 13, 2010, 10380-10385.
Lee et al., "Microactuation by Continuous Electrowetting Phenomenon and Silicon Deep Rie Process", Proc. MEMS (DSC--vol. 66) ASME Int. Mechanical Engineering Congress and Exposition, Anaheim, CA, Nov. 1998, 475-480.
Lee et al., "Liquid Micromotor Driven by Continuous Electrowetting", Proc. IEEE Micro Electro Mechanical Systems Workshop, Heidelberg, Germany, Jan. 1998, pp. 538-543.
Lee et al., "Theory and Modeling of Continuous Electrowetting Microactuation", Proc. MEMS (MEMS-vol. 1), ASME Int. Mechanical Engineering Congress and Exposition, Nashville, TN, Nov. 1999, pp. 397-403.

(56) References Cited

OTHER PUBLICATIONS

Malk et al., "EWOD in coplanar electrode configurations", Proceedings of ASME 2010 3rd Joint US-European Fluids Engineering Summer Meeting and 8th International Conference on Nanochannels, Microchannels, and Minichannels, http://asmedl.org/getabs/serylet/GetabsSerylet?prog=normal&id=ASMECP00201005450100023900000, Aug. 1-5, 2010.
Marchand et al., "Organic Synthesis in Soft Wall-Free Microreactors: Real-Time Monitoring of Fluorogenic Reactions", Analytical Chemistry, vol. 80, Jul. 2, 2008, 6051-6055.
Millington et al., "Digital microfluidics: a future technology in the newborn screening laboratory", Seminars in Perinatology, vol. 34, Apr. 2010, 163-169.
Millington et al., "Digital Microfluidics: a novel platform for multiplexed detection of LSDs with potential for newborn screening", Association of Public Health Laboratories Annual Conference, San Antonio, TX, Nov 4, 2008.
Millington et al., "Digital Microfluidics: a Novel Platform for Multiplexing Assays Used in Newborn Screening", Proceedings of the7th International and Latin American Congress. Oral Presentations. Rev Invest Clin; vol. 61 (Supl. 1), 2009, 21-33.
Paik et al., "A digital-microfluidic approach to chip cooling", IEEE Design & Test of Computers, vol. 25, Jul. 2008, 372-381.
Paik et al., "Adaptive Cooling of Integrated Circuits Using Digital Microfluidics", IEEE Transactions on VLSI, vol. 16, No. 4, 2008, 432-443.
Paik et al., "Adaptive Cooling of Integrated Circuits Using Digital Microfluidics", accepted for publication in IEEE Transactions on VLSI Systems, 2007, and Artech House, Norwood, MA, 2007.
Paik, "Adaptive Hot-Spot Cooling of Integrated Circuits Using Digital Microfluidics", Dissertation, Dept. Of Electrical and Computer Engineering, Duke University, Apr. 25, 2006, 1-188.
Paik et al., "Adaptive hot-spot cooling of integrated circuits using digital microfluidics", Proceedings ASME International Mechanical Engineering Congress and Exposition, Orlando, Florida, USA. IMECE2005-81081, Nov. 5-11, 2005, 1-6.
Paik et al., "Coplanar Digital Microfluidics Using Standard Printed Circuit Board Processes", 9th International Conference on Miniaturized Systems for Chemistry and Life Sciences (MicroTAS), Boston, MA; Poster, 2005.
Paik et al., "Coplanar Digital Microfluidics Using Standard Printed Circuit Board Processes", 9th Intl Conf. On Miniaturized Systems for Chemistry and Life Sciences, Boston, MA, Oct. 9-13, 2005, 566-68.
Paik et al., "Droplet-Based Hot Spot Cooling Using Topless Digital Microfluidics on a Printed Circuit Board", Int'l Workshops on Thermal Investigations of ICs and Systems (THERMINIC), 2005, 278-83.
Paik et al., "Electrowetting-based droplet mixers for microfluidic systems", Lab on a Chip (LOC), vol. 3. (more mixing videos available, along with the article, at LOC's website), 2003, 28-33.
Paik et al., "Programmable Flow-Through Real Time PCR Using Digital Microfluidics", 11th International Conference on Miniaturized Systems for Chemistry and Life Sciences, Paris, France, Oct. 7-11, 2007, 1559-1561.
Paik et al., "Programmable flow-through real-time PCR using digital microfluidics", Proc. Micro Total Analysis Systems (μTAS), Handout, 2007.
Paik et al., "Programmable flow-through real-time PCR using digital microfluidics", Proc. Micro Total Analysis Systems (μTAS), Poster, 2007.
Paik et al., "Rapid Droplet Mixers for Digital Microfluidic Systems", Masters Thesis, Duke Graduate School., 2002, 1-82.
Paik et al., "Rapid droplet mixers for digital microfluidic systems", Lab on a Chip, vol. 3. (More mixing videos available, along with the article, at LOC's website.), 2003, 253-259.
Paik et al., "Thermal effects on Droplet Transport in Digital Microfluids with Application to Chip Cooling Processing for Integrated Microfluidics", International Conference on Thermal, Mechanics, and Thermomechanical Phenomena in Electronic Systems (ITherm), 2004, 649-654.
Pamula, "A digital microfluidic platform for multiplexed explosive detection", Chapter 18, Electronics Noses and Sensors for the Detection of Explosives, Eds., J.W. Gardner and J. Yinon, Kluwer Academic Publishers, 2004.
Pamula et al., "A droplet-based lab-on-a-chip for colorimetric detection of nitroaromatic explosives", Proceedings of Micro Electro Mechanical Systems, 2005, 722-725.
Pamula et al., "Cooling of integrated circuits using droplet-based microfluidics", Proc. ACM Great Lakes Symposium on VLSI, Apr. 2003, 84-87.
Pamula, "Digital microfluidic lab-on-a-chip for multiplexing tests in newborn screening", Newborn Screening Summit: Envisioning a Future for Newborn Screening, Bethesda, MD, Dec. 7, 2009.
Pamula et al., "Digital microfluidic lab-on-a-chip for protein crystallization", 5th Protein Structure Initiative "Bottlenecks" Workshop, NIH, Bethesda, MD, Apr. 13-14, 2006,1-16.
Pamula et al., "Digital Microfluidic Methods in Diagnosis of Neonatal Biochemical Abnormalities", Developing Safe and Effective Devices and Instruments for Use in the Neonatal Intensive Care for the 21st Century, Pediatric Academic Societies' Annual Meeting, Vancouver, Canada, May 1-4, 2010.
Pamula et al., "Digital Microfluidic Platform for Multiplexing LSD Assays in Newborn Screening", LSD World Meeting, Las Vegas, NV, Feb 16-18, 2011.
Pamula et al., "Digital Microfluidics Platform for Lab-on-a-chip applications", Duke University Annual Post Doctoral Research Day, 2002.
Pamula et al., "Microfluidic electrowetting-based droplet mixing", IEEE, 2002, 8-10.
Pamula, "Sample Preparation and Processing using Magnetic Beads on a Digital Microfluidic Platform", CHI's Genomic Sample Prep, San Francisco, CA, Jun. 9-10, 2009.
Pamula, "Sample-to-sequence-molecular diagnostics on a digital microfluidic lab on a chip", Pre-conference workshops, 4th International Conference on Birth Defects and Disabilities in the Developing World, New Dehli, India, Oct. 4, 2009.
Pamula et al. (CO-CHAIR, "Digital Microfluidics for Lab-on-a-Chip Applications", "Emerging CAD Challenges for Biochip Design" Workshop, Conference on Design, Automation, and Test in Europe (DATE), Munich, Germany, Advance Programme, 2006, pp. 85-87.
Pollack et al., "Applications of Electrowetting-Based Digital Microfluidics in Clinical Diagnostics", Expert Rev. Mol. Diagn., vol. 11(4), 2011, 393-407.
Pollack et al., "Continuous sequencing-by-synthesis-based on a digital microfluidic platform", National Human Genome Research Institute, Advanced DNA Sequencing Technology Development Meeting, Chapel Hill, NC, Mar. 10-11, 2010.
Pollack, et al., "Electrowetting-Based Actuation of Droplets for Integrated Microfluidics", Lab on a Chip (LOC), vol. 2, 2002, 96-101.
Pollack et al., "Electrowetting-based actuation of liquid droplets for microfluidic applications", Appl. Phys. Letters, vol. 77, No. 11, Sep., 11, 2000, 1725-1726.
Pollack, "Electrowetting-based Microactuation of Droplets for Digital Microfluidics", PhD Thesis, Department of Electrical and Computer Engineering, Duke University, 2001.
Pollack et al., "Electrowetting-Based Microfluidics for High-Throughput Screening", smallTalk 2001 Conference Program Abstract, San Diego, Aug 27-31, 2001, 149.
Pollack et al., "Investigation of electrowetting-based microfluidics for real-time PCR applications", Proc. 7th Intl Conference on Micro Total Analysis Systems (mTAS), Squaw Valley, CA, Oct. 5-9, 2003, 619-622.
Pollack, "Lab-on-a-chip platform based digital microfluidics", the 6th International Electrowetting Meeting, Aug 20-22, 2008, 16.
Punnamaraju, "Voltage and Photo Induced Effects in Droplet-Interface-Bilayer Lipid", PhD Thesis, University of Cincinnati, 2011.
Punnamaraju et al., "Voltage Control of Droplet Interface Bilayer Lipid Membrane Dimensions", Langmuir the ACS Journal of Surfaces and Colloids, vol. 27, Issue 2, 2011, Published on Web, Dec. 10, 2010, 618-626.
Ren et al., "Automated electrowetting-based droplet dispensing with good reproducibility", Proc. Micro Total Analysis Systems (mTAS),

(56) References Cited

OTHER PUBLICATIONS

7th Int. Conf.On Miniaturized Chem and Biochem Analysis Systems, Squaw Valley, CA, Oct 5-9, 2003, 993-996.
Ren et al., "Automated on-chip droplet dispensing with volume control by electro-wetting actuation and capacitance metering", Sensors and Actuators B: Chemical, vol. 98, Mar. 2004, 319-327.
Ren et al., "Design and testing of an interpolating mixing architecture for electrowetting-based droplet-on-chip chemical dilution", Transducers, 12th International Conference on Solid-State Sensors, Actuators and Microsystems, 2003, 619-622.
Ren et al., "Dynamics of electro-wetting droplet transport", Sensors and Actuators B (Chemical), vol. B87, No. 1, Nov. 15, 2002, 201-206.
Ren et al., "Micro/Nano Liter Droplet Formation and Dispensing by Capacitance Metering and Electrowetting Actuation", IEEE-NANO, 2002, 369-372.
Rival et al., "EWOD Digital Microfluidic Device for Single Cells Sample Preparation and Gene Expression Analysis", Lab Automation 2010, Palm Springs Convention Center, Palm Springs, CA, USA; Abstract in Proceedings, Poster distributed at conference, Jan. 23-27, 2010.
Rival et al., "Expression de gènes de quelques cellules sur puce EWOD/Gene expression of few cells on EWOD chip", iRTSV,http://wwwdsv.cea.fr/var/plain/storage/original/media/File/iRTSV/thema_08(2).pdf (english translation), Winter 2009-2010.
Rival et al., "Towards Single Cells Gene Expression on EWOD Lab on Chip", ESONN 2008, Grenoble, France; Poster presented, Aug. 26, 2008.
Rival et al., "Towards single cells gene expression on EWOD lab on chip", ESONN, Grenoble, France, abstract in proceedings, Aug. 2008.
Rival et al., "Towards single cells gene expression preparation and analysis on ewod lab on chip", Nanobio Europe 2009, Poster distributed at conference, Jun. 16-18, 2009.
Rival et al., "Towards single cells gene expression preparation and analysis on ewod lab on chip", Nanobio Europe 2009, Abstract in proceedings, Jun. 16-18, 2009.
Rival et al., "Towards single cells gene expression preparation and analysis on ewod lab on chip", Lab on Chip Europe 2009 poster distributed at Conference, May 19-20, 2009.
Rival et al., "Towards single cells gene expression preparation and analysis on ewod lab on chip", Lab on Chip Europe 2009, Abstract in proceedings, May 19-20, 2009.
Rouse et al., "Digital microfluidics: a novel platform for multiplexing assays used in newborn screening", Poster 47, 41st AACC's Annual Oak Ridge Conference Abstracts, Clinical Chemistry, vol. 55, 2009, 1891.
Sherman et al., "Flow Control by Using High-Aspect-Ratio, In-Plane Microactuators", Sensors and Actuators, vol. 73, 1999, pp. 169-175.
Sherman et al., "In-Plane Microactuator for Fluid Control Application", Proc. IEEE Micro Electro Mechanical Systems Workshop, Heidelberg, Germany, Jan. 1998, pp. 454-459.
Shi et al., "Evaluation of stability of fluorometric reagent kits for screening of Lysosomal Storage Disorders", APHL Newborn Screening and Genetic Testing Symposium, San Diego, 2011,.
Sista et al., "96-Immunoassay Digital Microfluidic Multiwell Plate", Proc. µTAS, Oct. 12-16, 2008.
Sista, "Development of a Digital Microfluidic Lab-on-a-Chip for Automated Immunoassays with Magnetically Responsive Beads", PhD Thesis, Department of Chemical Engineering, Florida State University, 2007.
Sista et al., "Development of a digital microfluidic platform for point of care testing", Lab on a chip, vol. 8, Dec. 2008, First published as an Advance Article on the web, Nov. 5, 2008, 2091-2104.
Sista et al., "Digital Microfluidic platform for multiplexing LSD assays in newborn screening", APHL Newborn Screening and Genetic Testing Symposium, Orlando, May 3-6, 2010.
Sista et al., "Heterogeneous immunoassays using magnetic beads on a digital microfluidic platform", Lab on a Chip, vol. 8, Dec. 2008, First published as an Advance Article on the web, Oct. 14, 2008, 2188-2196.
Sista et al., "Performance of a digital microfluidic assay for Gaucher and Hurler disorders", APHL Newborn Screening and Genetic Testing Symposium, San Diego, 2011.
Sista et al., "Rapid, Single-Step Assay for Hunter Syndrome in Dried Blood Spots Using Digital Microfluidics", Clinica Chimica Acta, vol. 412, 2011, 1895-97.
Sista et al., "Spatial multiplexing of immunoassays for small-vol. samples", 10th PI Meeting IMAT, Bethesda, 2009.
Srinivasan et al., "3-D imaging of moving droplets for microfluidics using optical coherence tomography", Proc. 7th International Conference on Micro Total Analysis Systems (mTAS), Squaw Valley, CA, Oct 5-9, 2003, 1303-1306.
Srinivasan et al., "A digital microfluidic biosensor for multianalyte detection", Proc. IEEE 16th Annual Int'l Conf. On Micro Electro Mechanical Systems Conference, 2003, 327-330.
Srinivasan, "A Digital Microfluidic Lab-on-a-Chip for Clinical Diagnostic Applications", Ph.D. thesis, Dept of Electrical and Computer Engineering, Duke University, 2005.
Srinivasan et al., "An integrated digital microfluidic lab-on-a-chip for clinical diagnostics on human physiological fluids", Lab on a Chip, vol. 4, 2004, 310-315.
Srinivasan et al., "Clinical diagnostics on human whole blood, plasma, serum, urine, saliva, sweat and tears on a digital microfluidic platform", Proc. 7th International Conference on Micro Total Analysis Systems (mTAS), Squaw Valley, CA, Oct 5-9, 2003, 1287-1290.
Srinivasan et al., "Digital Microfluidic Lab-on-a-Chip for Protein Crystallization", the 82nd ACS Colloid and Surface Science Symposium, 2008.
Srinivasan et al., "Digital Microfluidics: a novel platform for multiplexed detection of lysosomal storage diseases for newborn screening", AACC Oak Ridge Conference Abstracts, Clinical Chemistry, vol. 54, 2008, 1934.
Srinivasan et al., "Droplet-based microfluidic lab-on-a-chip for glucose detection", Analytica Chimica Acta, vol. 507, No. 1, 2004, 145-150.
Srinivasan et al., "Electrowetting", Chapter 5, Methods in Bioengineering: Biomicrofabrication and Biomicrofluidics, Ed. J.D. Zahn, ISBN: 9781596934009, Artech House Publishers, 2010.
Srinivasan et al., "Feasibility of a point of care newborn screening platform for hyperbilirubinemia", APHL Newborn Screening and Genetic Testing Symposium, San Diego, 2011.
Srinivasan et al., "Low cost digital microfluidic platform for protein crystallization", Enabling Technologies for Structural Biology, NIGMS Workshop, Bethesda, MD., Mar. 4-6, 2009, J-23.
Srinivasan et al., "Protein Stamping for MALDI Mass Spectrometry Using an Electrowetting-based Microfluidic Platform", Lab-on-a-Chip: Platforms, Devices, and Applications, Conf. 5591, SPIE Optics East, Philadelphia, Oct. 25-28, 2004.
Srinivasan et al., "Scalable Macromodels for Microelectromechanical Systems", Technical Proc. 2001 Int. Conf. On Modeling and Simulation of Microsystems, 2001, 72-75.
Su et al., "Yield Enhancement of Digital Microfluidics-Based Biochips Using Space Redundancy and Local Reconfiguration", Proc. Design, Automation and Test in Europe (DATE) Conf., IEEE, 2005, 1196-1201.
Sudarsan et al., "Printed circuit technology for fabrication of plastic based microfluidic devices", Analytical Chemistry vol. 76, No. 11, Jun. 1, 2004, Previously published online, May 2004, 3229-3235.
Thwar et al., "DNA sequencing using digital microfluidics", Poster 42, 41st AACC's Annual Oak Ridge Conference Abstracts, Clinical Chemistry vol. 55, 2009, 1891.
Wang et al., "Comparison of enzyme activities for Pompe, Fabry, and Gaucher diseases on CDC's Quality Control spots between microplate fluorometry, mass spectrometry, and digital microfluidic fluorometry", APHL Newborn Screening and Genetic Testing Symposium, San Diego, 2011.
Wang et al., "Droplet-based micro oscillating-flow PCR chip", J. Micromechanics and Microengineering, vol. 15, 2005, 1369-1377.
Wang et al., "Efficient in-droplet separation of magnetic particles for digital microfluidics", Journal of Micromechanics and Microengineering, vol. 17, 2007, 2148-2156.
Wulff-Burchfield et al., "Microfluidic platform versus conventional real-time polymerase chain reaction for the detection of Mycoplasma

(56) References Cited

OTHER PUBLICATIONS pneumoniae in respiratory specimens", Diagnostic Microbiology and Infectious Disease, vol. 67, 2010, 22-29.
Xu et al., "A Cross-Referencing-Based Droplet Manipulation Method for High-Throughput and Pin-Constrained Digital Microfluidic Arrays", Proceedings of conference on Design, Automation and Test in Europe (DATE ), Apr. 2007.
Xu et al., "Automated Design of Pin-Constrained Digital Microfluidic Biochips Under Droplet-Interference Constraints", ACM Journal on Emerging Technologies is Computing Systems, vol. 3(3), 2007, 14:1-14:23.
Xu et al., "Automated solution preparation on a digital microfluidic lab-on-chip", PSI Bottlenecks Workshop, 2008.
Xu et al., "Automated, Accurate and Inexpensive Solution-Preparation on a Digital Microfluidic Biochip", Proc. IEEE Biomedical Circuits and Systems Conference (BioCAS), 2008, 301-304.
Xu et al., "Defect-Aware Synthesis of Droplet-Based Microfluidic Biochips", IEEE, 20th International Conference on VLSI Design, 2007.
Xu et al., "Defect-Tolerant Design and Optimization of a Digital Microfluidic Biochip for Protein Crystallization", IEEE Transactions on Computer Aided Design, vol. 29, No. 4, 2010, 552-565.
Xu et al., "Design and Optimization of a Digital Microfluidic Biochip for Protein Crystallization", Proc. IEEE/ACM International Conference on Computer-Aided Design (ICCAD), Nov. 2008, 297-301.
Xu et al., "Digital Microfluidic Biochip Design for Protein Crystallization", IEEE-NIH Life Science Systems and Applications Workshop, LISA, Bethesda, MD, Nov 8-9, 2007, 140-143.
Xu et al., "Droplet-Trace-Based Array Partitioning and a Pin Assignment Algorithm for the Automated Design of Digital Microfluidic Biochips", CODES, 2006, 112-117.
Xu et al., "Integrated Droplet Routing in the Synthesis of Microfluidic Biochips", IEEE, 2007, 948-953.
Xu et al., "Parallel Scan-Like Test and Multiple-Defect Diagnosis for Digital Microfluidic Biochips", IEEE Transactions on Biomedical Circuits and Systems, vol. 1(2), Jun. 2007, 148-158.
Xu et al., "Parallel Scan-Like Testing and Fault Diagnosis Techniques for Digital Microfluidic Biochips", Proceedings of the 12th IEEE European Test Symposium (ETS), Freiburg, Germany, May 20-24, 2007, 63-68.
Yang et al., "Manipulation of droplets in microfluidic systems", Trends in Analytical Chemistry, vol. 29, Feb. 2010, 141-157.
Yao et al., "Spot Cooling Using Thermoelectric Microcooler", Proc. 18th Int. Thermoelectric Conf, Baltimore, VA, pp. 256-259, Aug. 1999.
Yi et al., "Channel-to-droplet extractions for on-chip sample preparation", Solid-State Sensor, Actuators and Microsystems Workshop (Hilton Head '06), Hilton Head Island, SC, Jun. 2006, 128-131.
Yi et al., "Characterization of electrowetting actuation on addressable single-side coplanar electrodes", Journal of Micromechanics and Microengineering, vol. 16.,Oct. 2006, 2053-2059.
Yi et al., "EWOD Actuation with Electrode-Free Cover Plate", Digest of Tech. papers,l3th International Conference on Solid-State Sensors, Actuators and Microsystems (Transducers '05), Seoul, Korea, Jun. 5-9, 2005, 89-92.
Yi et al., "Geometric surface modification of nozzles for complete transfer of liquid drops", Solid-State Sensor, Actuator and Microsystems Workshop, Hilton Head Island, South Carolina, Jun. 6-10, 2004, 164-167.
Yi, "Soft Printing of Biological Liquids for Micro-arrays: Concept, Principle, Fabrication, and Demonstration", Ph.D. dissertation, UCLA, 2004.
Yi et al., "Soft Printing of Droplets Digitized by Electrowetting", Transducers 12th Int'l Conf. On Solid State Sensors, Actuators and Microsystems, Boston, Jun. 8-12, 2003, 1804-1807.
Yi et al., "Soft Printing of Droplets Pre-Metered by Electrowetting", Sensors and Actuators A: Physical, vol. 114, Jan 2004, 347-354.
Zeng et al., "Actuation and Control of Droplets by Using Electrowetting-on-Dielectric", Chin. Phys. Lett., vol. 21(9), 2004, 1851-1854.
Zhao et al., "Droplet Manipulation and Microparticle Sampling on Perforated Microfilter Membranes", J. Micromech. Microeng., vol. 18, 2008, 1-11.
Zhao et al., "In-droplet particle separation by travelling wave dielectrophoresis (twDEP) and EWOD", Solid-State Sensor, Actuators and Microsystems Workshop (Hilton Head '06), Hilton Head Island, SC, Jun. 2006, 181-184.
Zhao et al., "Micro air bubble manipulation by electrowetting on dielectric (EWOD): transporting, splitting, merging and eliminating of bubbles", Lab on a chip, vol. 7, 2007, First published as an Advance Article on the web, Dec. 4, 2006, 273-280.
Zhao et al., "Microparticle Concentration and Separation byTraveling-Wave Dielectrophoresis (twDEP) for Digital Microfluidics", J. Microelectromechanical Systems, vol. 16, No. 6, Dec. 2007, 1472-1481.
Zhao et al., "Synchronization of Concurrently-Implemented Fluidic Operations in Pin-Constrained Digital Microfluidic Biochips", VLSI Design, (Best Paper Award), 2010.
International Search Report dated Feb. 10, 2012 from PCT International Application No. PCT/US2011/041761.

* cited by examiner

Matrix 1600

DROPLET ACTUATOR ASSEMBLIES AND METHODS OF MAKING SAME

1 RELATED APPLICATIONS

In addition to the patent applications cited herein, each of which is incorporated herein by reference, this patent application is related to and claims priority to U.S. Provisional Patent Application Nos. 61/479,610, filed on Apr. 27, 2011, entitled "Droplet Actuator Assemblies and Methods of Making Same,"; and 61/360,034, filed on Jun. 30, 2010, entitled "Droplet Actuator Assemblies and Methods of Making Same," the entire disclosures of which are incorporated herein by reference.

GOVERNMENT SUPPORT

This invention was made with Government support under NIH Grant Numbers AI065169 and HG005186 awarded by the Public Health Service (PHS). The Government has certain rights in the invention.

2 FIELD OF THE INVENTION

The present invention generally relates to droplet actuators. In particular, the present invention is directed to droplet actuator assemblies and systems and methods of manufacturing the droplet actuator assemblies.

3 BACKGROUND OF THE INVENTION

A droplet actuator typically includes one or more substrates configured to form a surface or gap for conducting droplet operations. The one or more substrates establish a droplet operations surface or gap for conducting droplet operations and may also include electrodes arrange to conduct the droplet operations. The droplet operations substrate or the gap between the substrates may be coated or filled with a filler fluid that is immiscible with the liquid that forms the droplets. There is a need for droplet actuator designs that allow simple, low cost assembly and that are suitable for continuous flow droplet actuator manufacturing processes.

4 BRIEF DESCRIPTION OF THE INVENTION

The present invention is directed to droplet actuator assemblies and systems and methods of manufacturing the droplet actuator assemblies.

In one embodiment, a droplet actuator is provided. The droplet actuator may include an enclosure bottom substrate and an enclosure top substrate separated from each other to form a gap therebetween; a droplet operations substrate associated with a cavity formed in the enclosure bottom substrate, the droplet operations substrate having a droplet operations surface with droplet operations electrodes arranged thereon; and a gasket arranged on the enclosure top substrate substantially surrounding the perimeter of the droplet operations electrodes arrangement to form a fluid seal between the enclosure top substrate and the droplet operations substrate.

In another embodiment, a droplet actuator is provided. The droplet actuator may include an enclosure bottom substrate configured for accepting a droplet operations substrate; and an enclosure top substrate configured for accepting the enclosure bottom substrate, wherein a gap is formed between droplet operations substrate and the enclosure top substrate.

In yet another embodiment, a droplet actuator is provided. The droplet actuator may include an enclosure top substrate comprising sidewalls configured for accepting a droplet operations substrate having electrodes on a side thereof; and a cavity formed in the enclosure top substrate forming a gap between the electrode side of the droplet operations substrate and enclosure top substrate when assembled.

In yet another embodiment, a droplet actuator is provided. The droplet actuator may include an enclosure substrate; and a droplet operations substrate having electrodes arranged on a side thereon substantially completely enclosed therein, wherein a gap is formed between an inner surface of the enclosure substrate and the electrode side of the droplet operations substrate.

In yet another embodiment, a droplet actuator is provided. The droplet actuator may include a droplet operations substrate having droplet operations electrodes arranged on a side thereof and a top substrate separated by a gap when assembled; one or more gap setting features provided between the droplet operations substrate and the top substrate; and one or more bonding features formed on the gap facing side of the top substrate.

In yet another embodiment, an ultrasonic welding system for welding substrates of droplet actuator assemblies is provided. The ultrasonic welding system may include a welding horn; a top plate for holding one of the substrates to be welded, wherein the welding horn is coupled to the top plate and imparts ultrasonic energy thereto; and a base plate holding the other substrate to be welded.

In yet another embodiment, a method of welding substrates of a droplet actuator assembly is provided. The method may include providing an ultrasonic welding system, including: a welding horn; a top plate for holding one of the substrates to be welded, wherein the welding horn is coupled to the top plate and imparts ultrasonic energy thereto when activated; and a base plate holding the other substrate to be welded. The method may further include positioning the top plate such that the substrates are in contact with one another; and activating the welding horn, wherein the ultrasonic energy melts energy director features present on either or both substrates, thereby creating a bond between the two substrates.

In yet another embodiment, a method of forming droplet actuator assemblies is provided. The method may include providing a first assembly line for processing a continuous sheet of substrate material; providing a second assembly line for processing a continuous sheet of droplet operations substrate material; processing substrate material on the first assembly line, including providing a continuous sheet of substrate material to the first assembly line; embossing one or both sides of the substrate material to form one or more features; coating the substrate material with a Corona coating; coating the substrate material with PEDOT:PSS and curing; and coating the substrate material with CYTOP™ material and curing. The method may further include processing droplet operations substrate material on the second assembly line, including providing a continuous sheet of droplet operations substrate material to the second assembly line; coating the droplet operations substrate material with a Corona coating; printing conductive element features on one or both sides of the droplet operations substrate material; and curing the droplet operations substrate material. The method may further include merging the processed substrate material of the first assembly line and the processed droplet operations substrate material of the second assembly line such that the features of the substrate material and the features of the droplet operations substrate material are properly aligned; welding the merged processed substrate material and droplet operations substrate material together to form a droplet actuator assembly; cutting any required openings and/or slots in the droplet actuator assembly; and cutting to size individual finished droplet actuators from the continuous sheet of merged processed material.

In still yet another embodiment, a system for forming droplet actuator assemblies is provided. The system may include, a first assembly line for processing a continuous sheet of substrate material, including a source of continuous sheet substrate material; rollers to maintain proper position of and tension of the substrate material; an embossing station for embossing one or both sides of the substrate material to form one or more features; a Corona treatment station for coating the substrate material with a Corona coating; a PEDOT treatment station for coating the substrate material with PEDOT:PSS; a CYTOP™ treatment station for coating the substrate material with CYTOP™ material; and one or more curing stations. The system may further include a second assembly line for processing a continuous of sheet droplet operations substrate material, including a source of continuous sheet droplet operations substrate material; rollers to maintain proper position of and tension of the droplet operations substrate material; a Corona treatment station for coating the substrate material with a Corona coating; a printing station for printing conductive element features on one or both sides of the droplet operations substrate material; and one or more curing stations. The system may further include a welding station, wherein the substrate material of the first assembly line and the droplet operations substrate material of the second assembly line are merged together such that the features of the substrate material and the features of the droplet operations substrate material are properly aligned and the merged substrate material and the droplet operations substrate material are welded together to form a droplet actuator assembly; and a cutting station, wherein any required openings and/or slots in the droplet actuator assembly and individual finished droplet actuators are cut to size from the continuous sheet of merged material.

5 DEFINITIONS

As used herein, the following terms have the meanings indicated.

"Activate," with reference to one or more electrodes, means affecting a change in the electrical state of the one or more electrodes which, in the presence of a droplet, results in a droplet operation. Activation of an electrode can be accomplished using alternating or direct current. Any suitable voltage may be used. For example, an electrode may be activated using a voltage which is greater than about 150 V, or greater than about 200 V, or greater than about 250 V, or from about 275 V to about 375 V, or about 300 V. Where alternating current is used, any suitable frequency may be employed. For example, an electrode may be activated using alternating current having a frequency from about 1 Hz to about 100 Hz, or from about 10 Hz to about 60 Hz, or from about 20 Hz to about 40 Hz, or about 30 Hz.

"Bead," with respect to beads on a droplet actuator, means any bead or particle that is capable of interacting with a droplet on or in proximity with a droplet actuator. Beads may be any of a wide variety of shapes, such as spherical, generally spherical, egg shaped, disc shaped, cubical, amorphous and other three dimensional shapes. The bead may, for example, be capable of being subjected to a droplet operation in a droplet on a droplet actuator or otherwise configured with respect to a droplet actuator in a manner which permits a droplet on the droplet actuator to be brought into contact with the bead on the droplet actuator and/or off the droplet actuator. Beads may be provided in a droplet, in a droplet operations gap, or on a droplet operations surface. Beads may be provided in a reservoir that is external to a droplet operations gap or situated apart from a droplet operations surface, and the reservoir may be associated with a fluid path that permits a droplet including the beads to be brought into a droplet operations gap or into contact with a droplet operations surface. Beads may be manufactured using a wide variety of materials, including for example, resins, and polymers. The beads may be any suitable size, including for example, microbeads, microparticles, nanobeads and nanoparticles. In some cases, beads are magnetically responsive; in other cases beads are not significantly magnetically responsive. For magnetically responsive beads, the magnetically responsive material may constitute substantially all of a bead, a portion of a bead, or only one component of a bead. The remainder of the bead may include, among other things, polymeric material, coatings, and moieties which permit attachment of an assay reagent. Examples of suitable beads include flow cytometry microbeads, polystyrene microparticles and nanoparticles, functionalized polystyrene microparticles and nanoparticles, coated polystyrene microparticles and nanoparticles, silica microbeads, fluorescent microspheres and nanospheres, functionalized fluorescent microspheres and nanospheres, coated fluorescent microspheres and nanospheres, color dyed microparticles and nanoparticles, magnetic microparticles and nanoparticles, superparamagnetic microparticles and nanoparticles (e.g., DYNABEADS® particles, available from Invitrogen Group, Carlsbad, Calif.), fluorescent microparticles and nanoparticles, coated magnetic microparticles and nanoparticles, ferromagnetic microparticles and nanoparticles, coated ferromagnetic microparticles and nanoparticles, and those described in U.S. Patent Publication Nos. 20050260686, entitled "Multiplex flow assays preferably with magnetic particles as solid phase," published on Nov. 24, 2005; 20030132538, entitled "Encapsulation of discrete quanta of fluorescent particles," published on Jul. 17, 2003; 20050118574, entitled "Multiplexed Analysis of Clinical Specimens Apparatus and Method," published on Jun. 2, 2005; 20050277197. Entitled "Microparticles with Multiple Fluorescent Signals and Methods of Using Same," published on Dec. 15, 2005; 20060159962, entitled "Magnetic Microspheres for use in Fluorescence-based Applications," published on Jul. 20, 2006; the entire disclosures of which are incorporated herein by reference for their teaching concerning beads and magnetically responsive materials and beads. Beads may be pre-coupled with a biomolecule or other substance that is able to bind to and form a complex with a biomolecule. Beads may be pre-coupled with an antibody, protein or antigen, DNA/RNA probe or any other molecule with an affinity for a desired target. Examples of droplet actuator techniques for immobilizing magnetically responsive beads and/or non-magnetically responsive beads and/or conducting droplet operations protocols using beads are described in U.S. patent application Ser. No. 11/639,566, entitled "Droplet-Based Particle Sorting," filed on Dec. 15, 2006; U.S. Patent Application No. 61/039,183, entitled "Multiplexing Bead Detection in a Single Droplet," filed on Mar. 25, 2008; U.S. Patent Application No. 61/047,789, entitled "Droplet Actuator Devices and Droplet Operations Using Beads," filed on Apr. 25, 2008; U.S. Patent Application No. 61/086,183, entitled "Droplet Actuator Devices and Methods for Manipulating Beads," filed on Aug. 5, 2008; International Patent Application No. PCT/US2008/053545, entitled "Droplet Actuator Devices and Methods Employing Magnetic Beads," filed on Feb. 11, 2008; International Patent Application No. PCT/US2008/058018, entitled "Bead-based Multiplexed Analytical Methods and Instrumentation," filed on Mar. 24, 2008; International Patent Application No. PCT/US2008/058047, "Bead Sorting on a Droplet Actuator," filed on Mar. 23, 2008; and International Patent Application No. PCT/US2006/047486, entitled "Droplet-based Biochemistry," filed on Dec. 11, 2006; the entire disclosures of which are incorporated herein by reference. Bead characteristics may be employed in the multiplexing aspects of the invention. Examples of beads having characteristics suitable for multiplexing, as well as methods of detecting and analyzing signals emitted from such beads, may be found in U.S. Patent Publication No. 20080305481, entitled "Systems and Methods for Multiplex Analysis of PCR in Real Time," published on Dec. 11, 2008; U.S. Patent Publication No. 20080151240, "Methods and Systems for Dynamic Range Expansion," published on Jun. 26, 2008; U.S. Patent Publication No. 20070207513, entitled "Methods, Products, and Kits for Identifying an Analyte in a Sample," published on Sep. 6, 2007; U.S. Patent Publication No. 20070064990, entitled "Methods and Systems for Image Data Processing," published on Mar. 22, 2007; U.S. Patent Publication No. 20060159962, entitled "Magnetic Microspheres for use in Fluorescence-based Applications," published on Jul. 20, 2006; U.S. Patent Publication No. 20050277197, entitled "Microparticles with Multiple Fluorescent Signals and Methods of Using Same," published on Dec. 15, 2005; and U.S. Patent Publication No. 20050118574, entitled "Multiplexed Analysis of Clinical Specimens Apparatus and Method," published on Jun. 2, 2005.

"Droplet" means a volume of liquid on a droplet actuator. Typically, a droplet is at least partially bounded by a filler fluid. For example, a droplet may be completely surrounded by a filler fluid or may be bounded by filler fluid and one or more surfaces of the droplet actuator. As another example, a droplet may be bounded by filler fluid, one or more surfaces of the droplet actuator, and/or the atmosphere. As yet another example, a droplet may be bounded by filler fluid and the atmosphere. Droplets may, for example, be aqueous or non-aqueous or may be mixtures or emulsions including aqueous and non-aqueous components. Droplets may take a wide variety of shapes; nonlimiting examples include generally disc shaped, slug shaped, truncated sphere, ellipsoid, spherical, partially compressed sphere, hemispherical, ovoid, cylindrical, combinations of such shapes, and various shapes formed during droplet operations, such as merging or splitting or formed as a result of contact of such shapes with one or more surfaces of a droplet actuator. For examples of droplet fluids that may be subjected to droplet operations using the approach of the invention, see International Patent Application No. PCT/US 06/47486, entitled, "Droplet-Based Biochemistry," filed on Dec. 11, 2006. In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include a reagent, such as water, deionized water, saline solutions, acidic solutions, basic solutions, detergent solutions and/or buffers. Other examples of droplet contents include reagents, such as a reagent for a biochemical protocol, such as a nucleic acid amplification protocol, an affinity-based assay protocol, an enzymatic assay protocol, a sequencing protocol, and/or a protocol for analyses of biological fluids.

"Droplet Actuator" means a device for manipulating droplets. For examples of droplet actuators, see Pamula et al., U.S. Pat. No. 6,911,132, entitled "Apparatus for Manipulating Droplets by Electrowetting-Based Techniques," issued on Jun. 28, 2005; Pamula et al., U.S. patent application Ser. No. 11/343,284, entitled "Apparatuses and Methods for Manipulating Droplets on a Printed Circuit Board," filed on filed on Jan. 30, 2006; Pollack et al., International Patent Application No. PCT/US2006/047486, entitled "Droplet-Based Biochemistry," filed on Dec. 11, 2006; Shenderov, U.S. Pat. No. 6,773,566, entitled "Electrostatic Actuators for Microfluidics and Methods for Using Same," issued on Aug. 10, 2004 and U.S. Pat. No. 6,565,727, entitled "Actuators for Microfluidics Without Moving Parts," issued on Jan. 24, 2000; Kim and/or Shah et al., U.S. patent application Ser. No. 10/343,261, entitled "Electrowetting-driven Micropumping," filed on Jan. 27, 2003, Ser. No. 11/275,668, entitled "Method and Apparatus for Promoting the Complete Transfer of Liquid Drops from a Nozzle," filed on Jan. 23, 2006, Ser. No. 11/460,188, entitled "Small Object Moving on Printed Circuit Board," filed on Jan. 23, 2006, Ser. No. 12/465,935, entitled "Method for Using Magnetic Particles in Droplet Microfluidics," filed on May 14, 2009, and Ser. No. 12/513,157, entitled "Method and Apparatus for Real-time Feedback Control of Electrical Manipulation of Droplets on Chip," filed on Apr. 30, 2009; Velev, U.S. Pat. No. 7,547,380, entitled "Droplet Transportation Devices and Methods Having a Fluid Surface," issued on Jun. 16, 2009; Sterling et al., U.S. Pat. No. 7,163,612, entitled "Method, Apparatus and Article for Microfluidic Control via Electrowetting, for Chemical, Biochemical and Biological Assays and the Like," issued on Jan. 16, 2007; Becker and Gascoyne et al., U.S. Pat. No. 7,641,779, entitled "Method and Apparatus for Programmable fluidic Processing," issued on Jan. 5, 2010, and U.S. Pat. No. 6,977,033, entitled "Method and Apparatus for Programmable fluidic Processing," issued on Dec. 20, 2005; Decre et al., U.S. Pat. No. 7,328,979, entitled "System for Manipulation of a Body of Fluid," issued on Feb. 12, 2008; Yamakawa et al., U.S. Patent Pub. No. 20060039823, entitled "Chemical Analysis Apparatus," published on Feb. 23, 2006; Wu, International Patent Pub. No. WO/2009/003184, entitled "Digital Microfluidics Based Apparatus for Heat-exchanging Chemical Processes," published on Dec. 31, 2008; Fouillet et al., U.S. Patent Pub. No. 20090192044, entitled "Electrode Addressing Method," published on Jul. 30, 2009; Fouillet et al., U.S. Pat. No. 7,052,244, entitled "Device for Displacement of Small Liquid Volumes Along a Micro-catenary Line by Electrostatic Forces," issued on May 30, 2006; Marchand et al., U.S. Patent Pub. No. 20080124252, entitled "Droplet Microreactor," published on May 29, 2008; Adachi et al., U.S. Patent Pub. No. 20090321262, entitled "Liquid Transfer Device," published on Dec. 31, 2009; Roux et al., U.S. Patent Pub. No. 20050179746, entitled "Device for Controlling the Displacement of a Drop Between two or Several Solid Substrates," published on Aug. 18, 2005; Dhindsa et al., "Virtual Electrowetting Channels Electronic Liquid Transport with Continuous Channel Functionality," *Lab Chip,* 10:832-836 (2010); the entire disclosures of which are incorporated herein by reference, along with their priority documents. Certain droplet actuators will include one or more substrates arranged with a gap therebetween and electrodes associated with (e.g., layered on, attached to, and/or embedded in) the one or more substrates and arranged to conduct one or more droplet operations. For example, certain droplet actuators will include a base (or bottom) substrate, droplet operations electrodes associated with the substrate, one or more dielectric layers atop the substrate and/or electrodes, and optionally one or more hydrophobic layers atop the substrate, dielectric layers and/or the electrodes forming a droplet operations surface. A top substrate may also be provided, which is separated from the droplet operations surface by a gap, commonly referred to as a droplet operations gap. Various electrode arrangements on the top and/or bottom substrates are discussed in the above-referenced patents and applications and certain novel electrode arrangements are discussed in the description of the invention. During droplet operations it is preferred that droplets remain in continuous contact or frequent contact with a ground or reference electrode. A ground or reference electrode may be associated with the top substrate facing the gap, the bottom substrate facing the gap, in the gap. Where electrodes are provided on both substrates, electrical contacts for coupling the electrodes to a droplet actuator instrument for controlling or monitoring the electrodes may be associated with one or both plates. In some cases, electrodes on one substrate are electrically coupled to the other substrate so that only one substrate is in contact with the droplet actuator. In one embodiment, a conductive material (e.g., an epoxy, such as MASTER BOND™ Polymer System EP79, available from Master Bond, Inc., Hackensack, N.J.) provides the electrical connection between electrodes on one substrate and electrical paths on the other substrates, e.g., a ground electrode on a top substrate may be coupled to an electrical path on a bottom substrate by such a conductive material. Where multiple substrates are used, a spacer may be provided between the substrates to determine the height of the gap therebetween and define dispensing reservoirs. The spacer height may, for example, be from about 5 μm to about 600 μm, or about 100 μm to about 400 μm, or about 200 μm to about 350 μm, or about 250 μm to about 300 μm, or about 275 μm. The spacer may, for example, be formed of a layer of projections form the top or bottom substrates, and/or a material inserted between the top and bottom substrates. One or more openings may be provided in the one or more substrates for forming a fluid path through which liquid may be delivered into the droplet operations gap. The one or more openings may in some cases be aligned for interaction with one or more electrodes, e.g., aligned such that liquid flowed through the opening will come into sufficient proximity with one or more droplet operations electrodes to permit a droplet operation to be effected by the droplet operations electrodes using the liquid. The base (or bottom) and top substrates may in some cases be formed as one integral component. One or more reference electrodes may be provided on the base (or bottom) and/or top substrates and/or in the gap. Examples of reference electrode arrangements are provided in the above referenced patents and patent applications. In various embodiments, the manipulation of droplets by a droplet actuator may be electrode mediated, e.g., electrowetting mediated or dielectrophoresis mediated or Coulombic force mediated. Examples of other techniques for controlling droplet operations that may be used in the droplet actuators of the invention include using devices that induce hydrodynamic fluidic pressure, such as those that operate on the basis of mechanical principles (e.g. external syringe pumps, pneumatic membrane pumps, vibrating membrane pumps, vacuum devices, centrifugal forces, piezoelectric/ultrasonic pumps and acoustic forces); electrical or magnetic principles (e.g. electroosmotic flow, electrokinetic pumps, ferrofluidic plugs, electrohydrodynamic pumps, attraction or repulsion using magnetic forces and magnetohydrodynamic pumps); thermodynamic principles (e.g. gas bubble generation/phase-change-induced volume expansion); other kinds of surface-wetting principles (e.g. electrowetting, and optoelectrowetting, as well as chemically, thermally, structurally and radioactively induced surface-tension gradients); gravity; surface tension (e.g., capillary action); electrostatic forces (e.g., electroosmotic flow); centrifugal flow (substrate disposed on a compact disc and rotated); magnetic forces (e.g., oscillating ions causes flow); magnetohydrodynamic forces; and vacuum or pressure differential. In certain embodiments, combinations of two or more of the foregoing techniques may be employed to conduct a droplet operation in a droplet actuator of the invention. Similarly, one or more of the foregoing may be used to deliver liquid into a droplet operations gap, e.g., from a reservoir in another device or from an external reservoir of the droplet actuator (e.g., a reservoir associated with a droplet actuator substrate and a fluid path from the reservoir into the droplet operations gap). Droplet operations surfaces of certain droplet actuators of the invention may be made from hydrophobic materials or may be coated or treated to make them hydrophobic. For example, in some cases some portion or all of the droplet operations surfaces may be derivatized with low surface-energy materials or chemistries, e.g., by deposition or using in situ synthesis using compounds such as poly- or per-fluorinated compounds in solution or polymerizable monomers. Examples include TEFLON® AF (available from DuPont, Wilmington, Del.), members of the CYTOP™ family of materials, coatings in the FLUOROPEL® family of hydrophobic and superhydrophobic coatings (available from Cytonix Corporation, Beltsville, Md.), silane coatings, fluorosilane coatings, hydrophobic phosphonate derivatives (e.g., those sold by Aculon, Inc), and NOVEC™ electronic coatings (available from 3M Company, St. Paul, Minn.), and other fluorinated monomers for plasma-enhanced chemical vapor deposition (PECVD). In some cases, the droplet operations surface may include a hydrophobic coating having a thickness ranging from about 10 nm to about 1,000 nm. Moreover, in some embodiments, the top substrate of the droplet actuator includes an electrically conducting organic polymer, which is then coated with a hydrophobic coating or otherwise treated to make the droplet operations surface hydrophobic. For example, the electrically conducting organic polymer that is deposited onto a plastic substrate may be poly(3,4-ethylenedioxythiophene) poly(styrenesulfonate) (PEDOT:PSS). Other examples of electrically conducting organic polymers and alternative conductive layers are described in Pollack et al., International Patent Application No. PCT/US2010/040705, entitled "Droplet Actuator Devices and Methods," the entire disclosure of which is incorporated herein by reference. One or both substrates may be fabricated using a printed circuit board (PCB), glass, indium tin oxide (ITO)-coated glass, and/or semiconductor materials as the substrate. When the substrate is ITO-coated glass, the ITO coating is preferably a thickness in the range of about 20 to about 200 nm, preferably about 50 to about 150 nm, or about 75 to about 125 nm, or about 100 nm. In some cases, the top and/or bottom substrate includes a PCB substrate that is coated with a dielectric, such as a polyimide dielectric, which may in some cases also be coated or otherwise treated to make the droplet operations surface hydrophobic. When the substrate includes a PCB, the following materials are examples of suitable materials: MITSUI™ BN-300 (available from MITSUI Chemicals America, Inc., San Jose Calif.); ARLON™ 11N (available from Arlon, Inc, Santa Ana, Calif.); NELCO® N4000-6 and N5000-30/32 (available from Park Electrochemical Corp., Melville, N.Y.); ISOLA™ FR406 (available from Isola Group, Chandler, Ariz.), especially IS620; fluoropolymer family (suitable for fluorescence detection since it has low background fluorescence); polyimide family; polyester; polyethylene naphthalate; polycarbonate; polyetheretherketone; liquid crystal polymer; cyclo-olefin copolymer (COC); cyclo-olefin polymer (COP); aramid; THERMOUNT® nonwoven aramid reinforcement (available from DuPont, Wilmington, Del.); NOMEX® brand fiber (available from DuPont, Wilmington, Del.); and paper. Various materials are also suitable for use as the dielectric component of the substrate. Examples include: vapor deposited dielectric, such as PARYLENE™ C (especially on glass) and PARYLENE™ N (available from Parylene Coating Services, Inc., Katy, Tex.); TEFLON® AF coatings; CYTOP™; soldermasks, such as liquid photoimageable soldermasks (e.g., on PCB) like TAIYO™ PSR4000 series, TAIYO™ PSR and AUS series (available from Taiyo America, Inc. Carson City, Nev.) (good thermal characteristics for applications involving thermal control), and PROBIMER™ 8165 (good thermal characteristics for applications involving thermal control (available from Huntsman Advanced Materials Americas Inc., Los Angeles, Calif.); dry film soldermask, such as those in the VACREL® dry film soldermask line (available from DuPont, Wilmington, Del.); film dielectrics, such as polyimide film (e.g., KAPTON® polyimide film, available from DuPont, Wilmington, Del.), polyethylene, and fluoropolymers (e.g., FEP), polytetrafluoroethylene; polyester; polyethylene naphthalate; cyclo-olefin copolymer (COC); cyclo-olefin polymer (COP); any other PCB substrate material listed above; black matrix resin; and polypropylene. Droplet transport voltage and frequency may be selected for performance with reagents used in specific assay protocols. Design parameters may be varied, e.g., number and placement of on-chip reservoirs, number of independent electrode connections, size (volume) of different reservoirs, placement of magnets/bead washing zones, electrode size, inter-electrode pitch, and gap height (between top and bottom substrates) may be varied for use with specific reagents, protocols, droplet volumes, etc. In some cases, a substrate of the invention may derivatized with low surface-energy materials or chemistries, e.g., using deposition or in situ synthesis using poly- or per-fluorinated compounds in solution or polymerizable monomers. Examples include TEFLON® AF coatings and FLUOROPEL® coatings for dip or spray coating, and other fluorinated monomers for plasma-enhanced chemical vapor deposition (PECVD). Additionally, in some cases, some portion or all of the droplet operations surface may be coated with a substance for reducing background noise, such as background fluorescence from a PCB substrate. For example, the noise-reducing coating may include a black matrix resin, such as the black matrix resins available from Toray industries, Inc., Japan. Electrodes of a droplet actuator are typically controlled by a controller or a processor, which is itself provided as part of a system, which may include processing functions as well as data and software storage and input and output capabilities. Reagents may be provided on the droplet actuator in the droplet operations gap or in a reservoir fluidly coupled to the droplet operations gap. The reagents may be in liquid form, e.g., droplets, or they may be provided in a reconstitutable form in the droplet operations gap or in a reservoir fluidly coupled to the droplet operations gap. Reconstitutable reagents may typically be combined with liquids for reconstitution. An example of reconstitutable reagents suitable for use with the invention includes those described in Meathrel, et al., U.S. Pat. No. 7,727,466, entitled "Disintegratable films for diagnostic devices," granted on Jun. 1, 2010.

"Droplet operation" means any manipulation of a droplet on a droplet actuator. A droplet operation may, for example, include: loading a droplet into the droplet actuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a droplet actuator; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles. For examples of droplet operations, see the patents and patent applications cited above under the definition of "droplet actuator." Impedance or capacitance sensing or imaging techniques may sometimes be used to determine or confirm the outcome of a droplet operation. Examples of such techniques are described in Sturmer et al., International Patent Pub. No. WO/2008/101194, entitled "Capacitance Detection in a Droplet Actuator," published on Aug. 21, 2008, the entire disclosure of which is incorporated herein by reference. Generally speaking, the sensing or imaging techniques may be used to confirm the presence or absence of a droplet at a specific electrode. For example, the presence of a dispensed droplet at the destination electrode following a droplet dispensing operation confirms that the droplet dispensing operation was effective. Similarly, the presence of a droplet at a detection spot at an appropriate step in an assay protocol may confirm that a previous set of droplet operations has successfully produced a droplet for detection. Droplet transport time can be quite fast. For example, in various embodiments, transport of a droplet from one electrode to the next may exceed about 1 sec, or about 0.1 sec, or about 0.01 sec, or about 0.001 sec. In one embodiment, the electrode is operated in AC mode but is switched to DC mode for imaging. It is helpful for conducting droplet operations for the footprint area of droplet to be similar to electrowetting area; in other words, 1×-, 2×- 3×-droplets are usefully controlled operated using 1, 2, and 3 electrodes, respectively. If the droplet footprint is greater than the number of electrodes available for conducting a droplet operation at a given time, the difference between the droplet size and the number of electrodes should typically not be greater than 1; in other words, a 2× droplet is usefully controlled using 1 electrode and a 3× droplet is usefully controlled using 2 electrodes. When droplets include beads, it is useful for droplet size to be equal to the number of electrodes controlling the droplet, e.g., transporting the droplet.

"Filler fluid" means a fluid associated with a droplet operations substrate of a droplet actuator, which fluid is sufficiently immiscible with a droplet phase to render the droplet phase subject to electrode-mediated droplet operations. For example, the gap of a droplet actuator is typically filled with a filler fluid. The filler fluid may, for example, be a low-viscosity oil, such as silicone oil or hexadecane filler fluid. The filler fluid may fill the entire gap of the droplet actuator or may coat one or more surfaces of the droplet actuator. Filler fluids may be conductive or non-conductive. Filler fluids may, for example, be doped with surfactants or other additives. For example, additives may be selected to improve droplet operations and/or reduce loss of reagent or target substances from droplets, formation of microdroplets, cross contamination between droplets, contamination of droplet actuator surfaces, degradation of droplet actuator materials, etc. Composition of the filler fluid, including surfactant doping, may be selected for performance with reagents used in the specific assay protocols and effective interaction or non-interaction with droplet actuator materials. Examples of filler fluids and filler fluid formulations suitable for use with the invention are provided in Srinivasan et al, International Patent Pub. Nos. WO/2010/027894, entitled "Droplet Actuators, Modified Fluids and Methods," published on Mar. 11, 2010, and WO/2009/021173, entitled "Use of Additives for Enhancing Droplet Operations," published on Feb. 12, 2009; Sista et al., International Patent Pub. No. WO/2008/098236, entitled "Droplet Actuator Devices and Methods Employing Magnetic Beads," published on Aug. 14, 2008; and Monroe et al., U.S. Patent Publication No. 20080283414, entitled "Electrowetting Devices," filed on May 17, 2007; the entire disclosures of which are incorporated herein by reference, as well as the other patents and patent applications cited herein.

"Immobilize" with respect to magnetically responsive beads, means that the beads are substantially restrained in position in a droplet or in filler fluid on a droplet actuator. For example, in one embodiment, immobilized beads are sufficiently restrained in position in a droplet to permit execution of a droplet splitting operation, yielding one droplet with substantially all of the beads and one droplet substantially lacking in the beads.

"Magnetically responsive" means responsive to a magnetic field. "Magnetically responsive beads" include or are composed of magnetically responsive materials. Examples of magnetically responsive materials include paramagnetic materials, ferromagnetic materials, ferrimagnetic materials, and metamagnetic materials. Examples of suitable paramagnetic materials include iron, nickel, and cobalt, as well as metal oxides, such as $Fe_3O_4$, $BaFe_{12}O_{19}$, CoO, NiO, $Mn_2O_3$, $Cr_2O_3$, and CoMnP.

"Reservoir" means an enclosure or partial enclosure configured for holding, storing, or supplying liquid. A droplet actuator system of the invention may include on-cartridge reservoirs and/or off-cartridge reservoirs. On-cartridge reservoirs may be (1) on-actuator reservoirs, which are reservoirs in the droplet operations gap or on the droplet operations surface; (2) off-actuator reservoirs, which are reservoirs on the droplet actuator cartridge, but outside the droplet operations gap, and not in contact with the droplet operations surface; or (3) hybrid reservoirs which have on-actuator regions and off-actuator regions.

An example of an off-actuator reservoir is a reservoir in the top substrate. An off-actuator reservoir is typically in fluid communication with an opening or fluid path arranged for flowing liquid from the off-actuator reservoir into the droplet operations gap, such as into an on-actuator reservoir. An off-cartridge reservoir may be a reservoir that is not part of the droplet actuator cartridge at all, but which flows liquid to some portion of the droplet actuator cartridge. For example, an off-cartridge reservoir may be part of a system or docking station to which the droplet actuator cartridge is coupled during operation. Similarly, an off-cartridge reservoir may be a reagent storage container or syringe which is used to force fluid into an on-cartridge reservoir or into a droplet operations gap. A system using an off-cartridge reservoir will typically include a fluid passage means whereby liquid may be transferred from the off-cartridge reservoir into an on-cartridge reservoir or into a droplet operations gap.

"Transporting into the magnetic field of a magnet," "transporting towards a magnet," and the like, as used herein to refer to droplets and/or magnetically responsive beads within droplets, is intended to refer to transporting into a region of a magnetic field capable of substantially attracting magnetically responsive beads in the droplet. Similarly, "transporting away from a magnet or magnetic field," "transporting out of the magnetic field of a magnet," and the like, as used herein to refer to droplets and/or magnetically responsive beads within droplets, is intended to refer to transporting away from a region of a magnetic field capable of substantially attracting magnetically responsive beads in the droplet, whether or not the droplet or magnetically responsive beads is completely removed from the magnetic field. It will be appreciated that in any of such cases described herein, the droplet may be transported towards or away from the desired region of the magnetic field, and/or the desired region of the magnetic field may be moved towards or away from the droplet. Reference to an electrode, a droplet, or magnetically responsive beads being "within" or "in" a magnetic field, or the like, is intended to describe a situation in which the electrode is situated in a manner which permits the electrode to transport a droplet into and/or away from a desired region of a magnetic field, or the droplet or magnetically responsive beads is/are situated in a desired region of the magnetic field, in each case where the magnetic field in the desired region is capable of substantially attracting any magnetically responsive beads in the droplet. Similarly, reference to an electrode, a droplet, or magnetically responsive beads being "outside of" or "away from" a magnetic field, and the like, is intended to describe a situation in which the electrode is situated in a manner which permits the electrode to transport a droplet away from a certain region of a magnetic field, or the droplet or magnetically responsive beads is/are situated away from a certain region of the magnetic field, in each case where the magnetic field in such region is not capable of substantially attracting any magnetically responsive beads in the droplet or in which any remaining attraction does not eliminate the effectiveness of droplet operations conducted in the region. In various aspects of the invention, a system, a droplet actuator, or another component of a system may include a magnet, such as one or more permanent magnets (e.g., a single cylindrical or bar magnet or an array of such magnets, such as a Halbach array) or an electromagnet or array of electromagnets, to form a magnetic field for interacting with magnetically responsive beads or other components on chip. Such interactions may, for example, include substantially immobilizing or restraining movement or flow of magnetically responsive beads during storage or in a droplet during a droplet operation or pulling magnetically responsive beads out of a droplet.

"Washing" with respect to washing a bead means reducing the amount and/or concentration of one or more substances in contact with the bead or exposed to the bead from a droplet in contact with the bead. The reduction in the amount and/or concentration of the substance may be partial, substantially complete, or even complete. The substance may be any of a wide variety of substances; examples include target substances for further analysis, and unwanted substances, such as components of a sample, contaminants, and/or excess reagent. In some embodiments, a washing operation begins with a starting droplet in contact with a magnetically responsive bead, where the droplet includes an initial amount and initial concentration of a substance. The washing operation may proceed using a variety of droplet operations. The washing operation may yield a droplet including the magnetically responsive bead, where the droplet has a total amount and/or concentration of the substance which is less than the initial amount and/or concentration of the substance. Examples of suitable washing techniques are described in Pamula et al., U.S. Pat. No. 7,439,014, entitled "Droplet-Based Surface Modification and Washing," granted on Oct. 21, 2008, the entire disclosure of which is incorporated herein by reference.

The terms "top," "bottom," "over," "under," and "on" are used throughout the description with reference to the relative positions of components of the droplet actuator, such as relative positions of top and bottom substrates of the droplet actuator. It will be appreciated that the droplet actuator is functional regardless of its orientation in space.

When a liquid in any form (e.g., a droplet or a continuous body, whether moving or stationary) is described as being "on", "at", or "over" an electrode, array, matrix or surface, such liquid could be either in direct contact with the electrode/array/matrix/surface, or could be in contact with one or more layers or films that are interposed between the liquid and the electrode/array/matrix/surface.

When a droplet is described as being "on" or "loaded on" a droplet actuator, it should be understood that the droplet is arranged on the droplet actuator in a manner which facilitates using the droplet actuator to conduct one or more droplet operations on the droplet, the droplet is arranged on the droplet actuator in a manner which facilitates sensing of a property of or a signal from the droplet, and/or the droplet has been subjected to a droplet operation on the droplet actuator.

6 BRIEF DESCRIPTION OF THE DRAWINGS

Figure 12A:
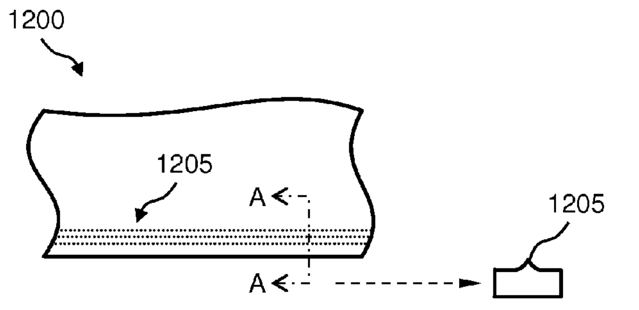
Figure 12B:
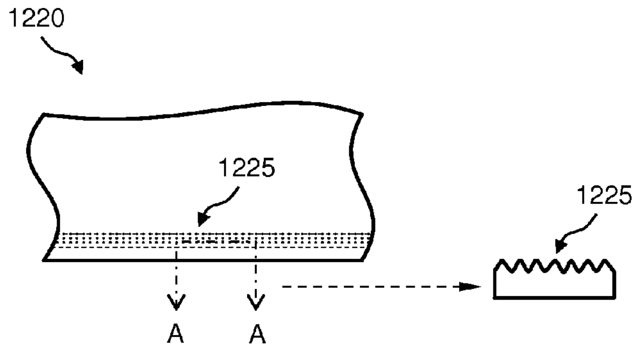
Figure 12C:
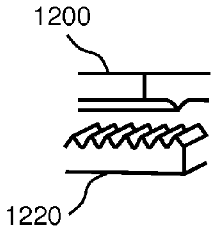
Figure 13:
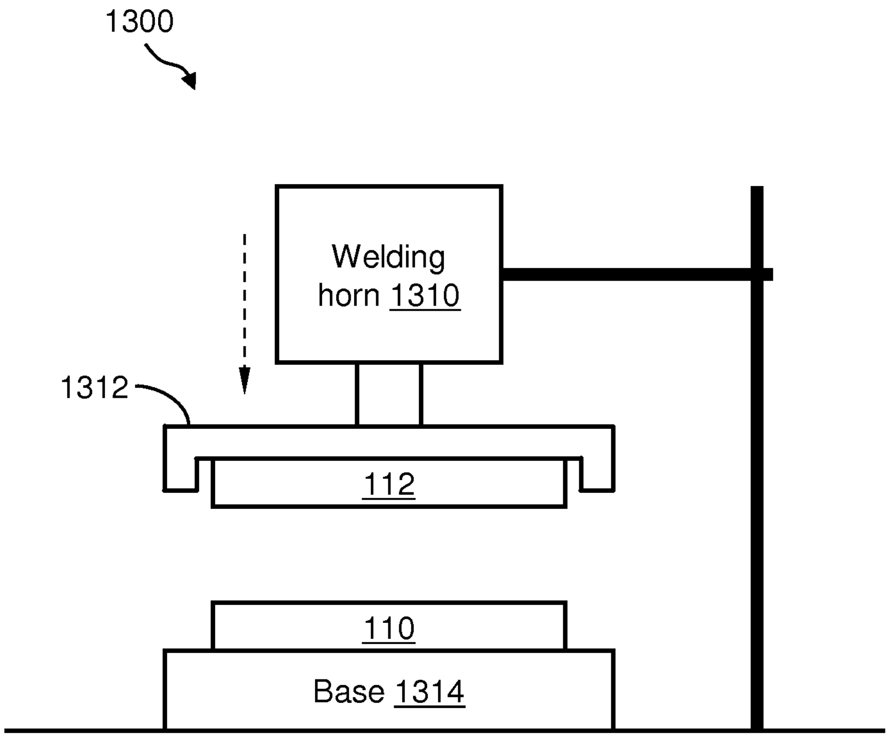
Figure 14:
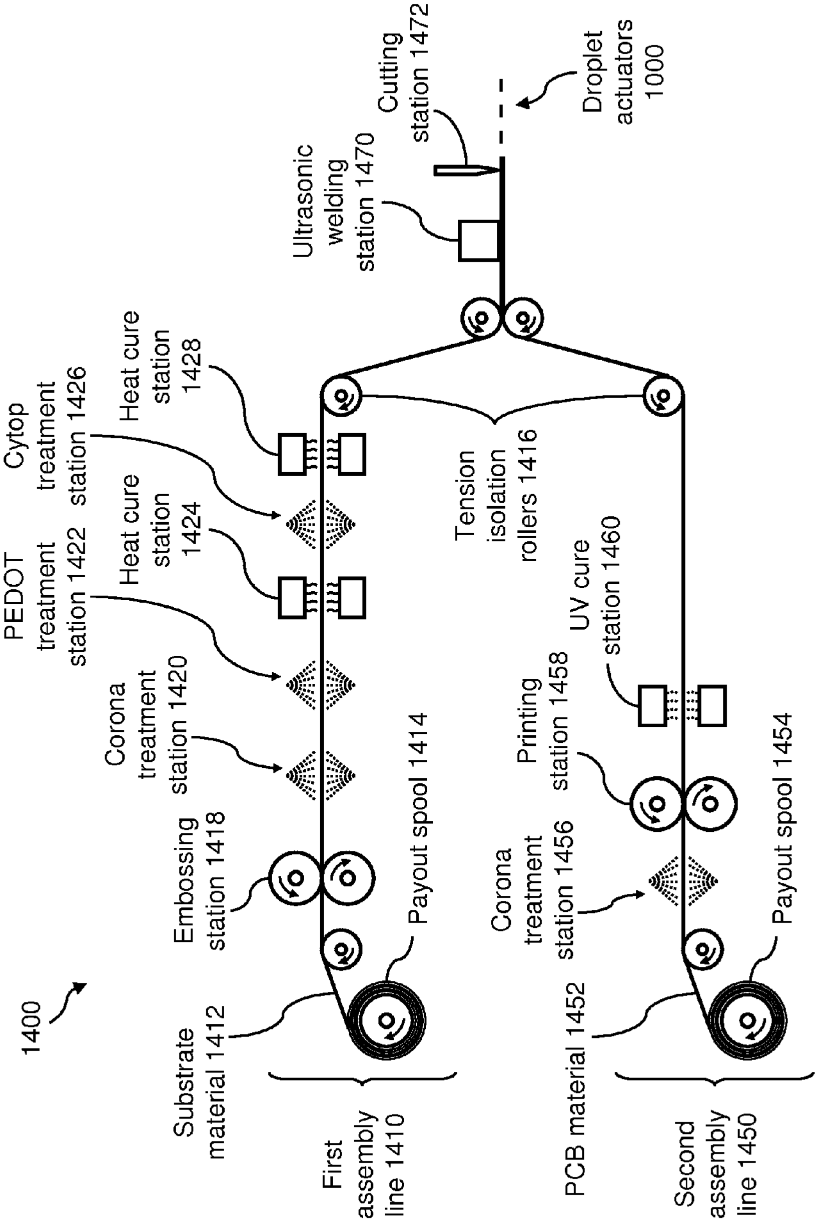
Figure 15:
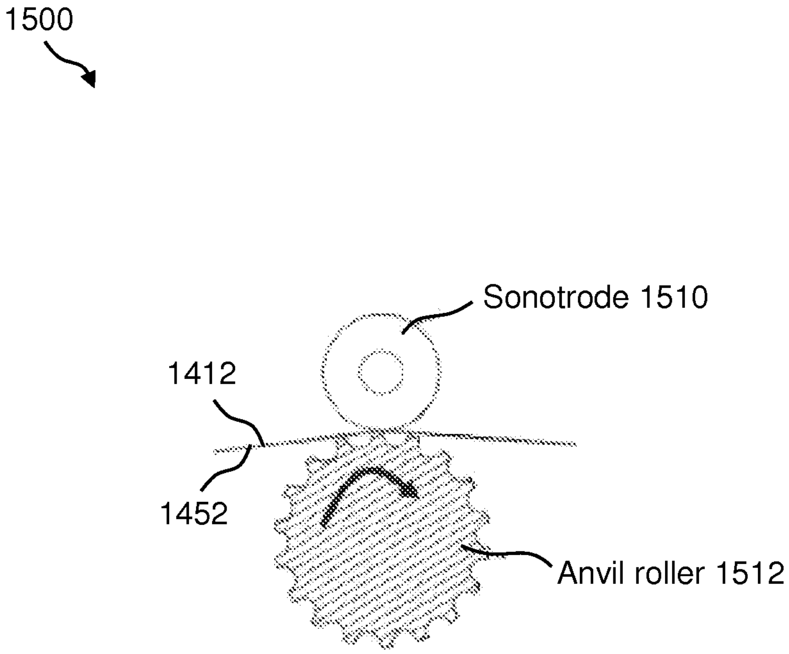
Figure 16:
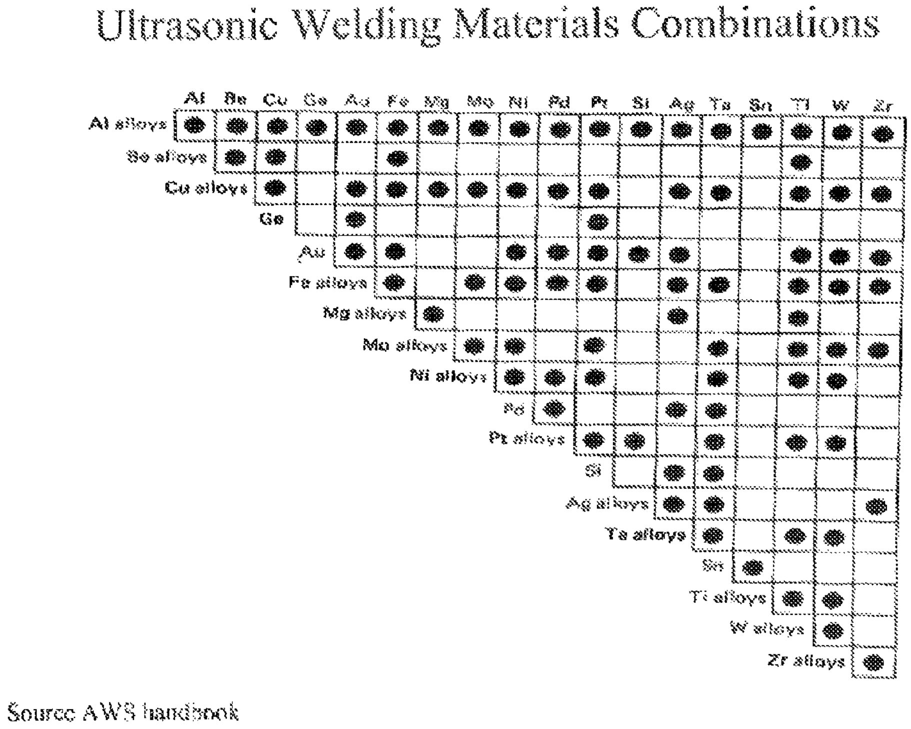

FIGS. 12A, 12B, and 12C illustrate views of another example of energy director features that may be incorporated in the droplet actuator assemblies of the present invention for facilitating the ultrasonic welding process;

FIG. 13 illustrates a side view of an example of an ultrasonic welding system for welding substrates of droplet actuator assemblies;

FIG. 14 illustrates a side view of an example of a continuous reel-to-reel manufacturing process for forming droplet actuator assemblies;

FIG. 15 illustrates a side view of an example of an ultrasonic stitch welding mechanism for use in a continuous reel-to-reel manufacturing process for forming droplet actuator assemblies; and FIG. 16 illustrates a matrix that shows various combinations of materials that may be ultrasonically welded in a droplet actuator application.

7 DETAILED DESCRIPTION OF THE INVENTION

The invention provides droplet actuator assemblies and systems and methods of manufacturing the droplet actuator assemblies. In certain embodiments, two-piece enclosures are used to form a droplet actuator assembly that houses a droplet operations substrate. In certain other embodiments, one-piece enclosures are used to form a droplet actuator assembly that houses a droplet operations substrate. In the plastic injection molding process for forming substrates of the droplet actuator assemblies of the present invention may utilize insert molding (or overmolding) processes for forming a gasket in at least one substrate, thereby avoiding the need for providing and installing a separate gasket component. Further, the droplet actuator assemblies may include features that allow ultrasonic welding processes to be used for bonding substrates together. The manufacturing systems of the present invention for fabricating the droplet actuator assemblies may utilize continuous flow reel-to-reel manufacturing processes.

7.1 Ultrasonically Welded and/or Gasketless Droplet Actuator Assemblies

Figure 1A:
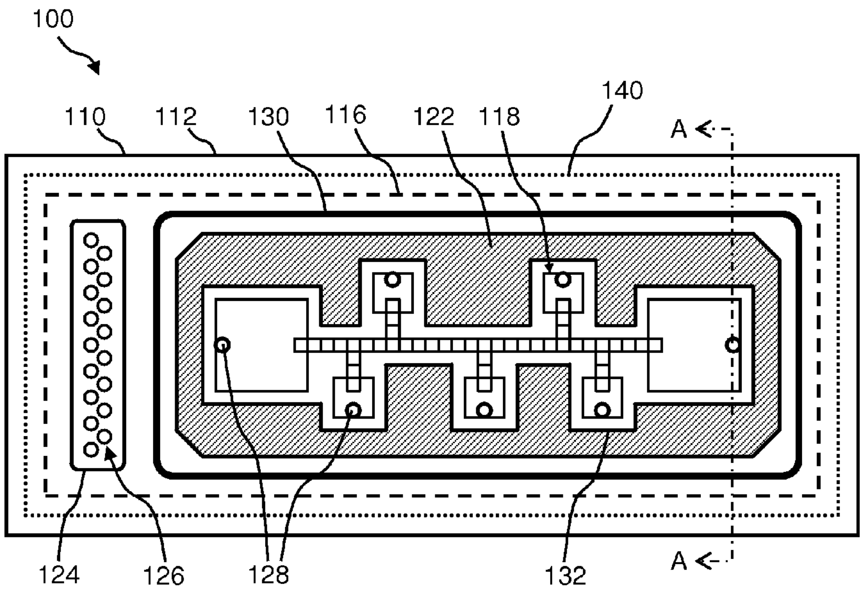
FIG. 1A illustrates a top view of an example of a droplet actuator assembly that is constructed using a gasketless two-piece enclosure design.
Figure 1B:
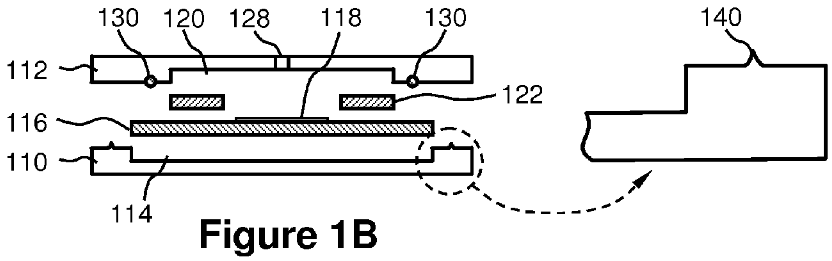
FIG. 1B illustrates an exploded cross-sectional view of the droplet actuator assembly of FIG. 1A, taken along line AA of FIG. 1A.
Figure 1C:
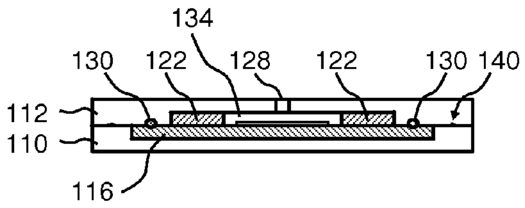
FIG. 1C illustrates a cross-sectional view of the droplet actuator assembly of FIG. 1A when assembled, taken along line AA of FIG. 1A.

FIG. 1A illustrates a top view of an example of a droplet actuator assembly 100 that is constructed using a gasketless two-piece enclosure design. FIG. 1B illustrates an exploded cross-sectional view of droplet actuator assembly 100, taken along line AA of FIG. 1A. FIG. 1C illustrates a cross-sectional view of droplet actuator assembly 100 when assembled, again taken along line AA of FIG. 1A.

The two-piece enclosure of droplet actuator assembly 100 is formed, for example, by an enclosure bottom substrate 110 and an enclosure top substrate 112. Enclosure bottom substrate 110 and enclosure top substrate 112 may be formed by injection molding processes. For example, enclosure bottom substrate 110 and enclosure top substrate 112 may be formed of substantially transparent materials such as, but not limited to, polycarbonate (PC), MDH12, cyclic olefin polymer (COP), cyclic olefin copolymer (COC), and/or thermoplastic.

Figure 2A:
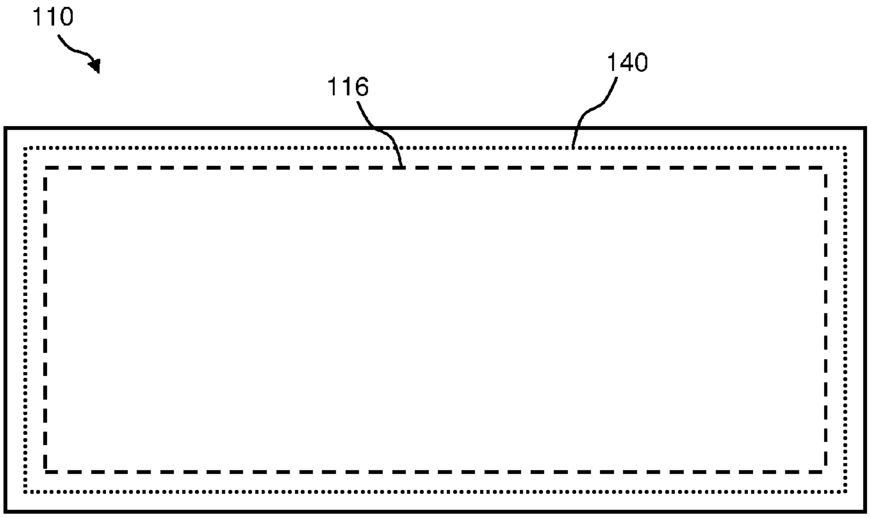
FIGS. 2A and 2B illustrate top and side views, respectively, of an example of the enclosure bottom substrate of the droplet actuator assembly of FIG. 1A.
Figure 2B:

Enclosure bottom substrate 110 includes a cavity 114 for accepting a droplet operations substrate 116. The shape and depth of cavity 114 substantially corresponds to the thickness and shape of droplet operations substrate 116. More details of enclosure bottom substrate 110 are shown in FIGS. 2A and 2B.

Figure 4A:
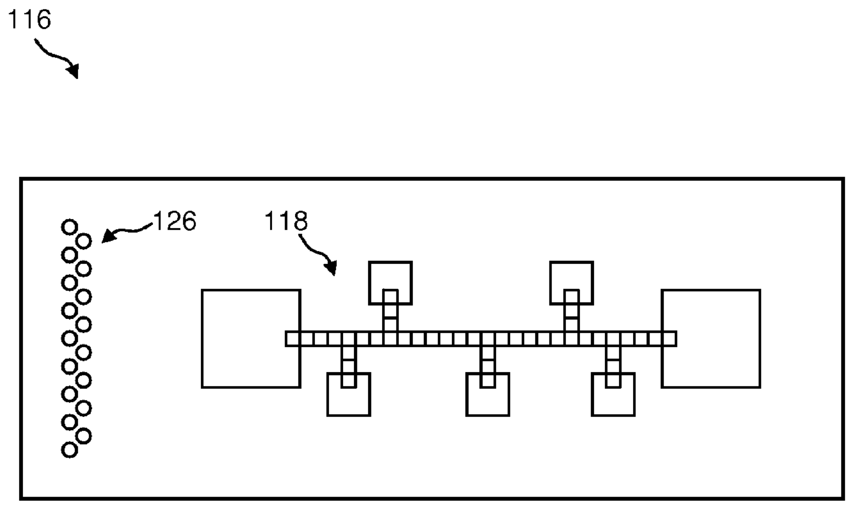
FIGS. 4A and 4B illustrate top and side views, respectively, of an example of the droplet operations substrate of the droplet actuator assembly of FIG. 1A.
Figure 4B:

Droplet operations substrate 116 may be formed, for example, of a printed circuit board (PCB) that has an electrode arrangement 118 patterned thereon. Electrode arrangement 118 includes, for example, an arrangement of one or more lines and/or paths of various types of electrodes (e.g., reservoir electrodes and electrowetting electrodes) for performing droplet operations. More details of droplet operations substrate 116 are shown in FIGS. 4A and 4B.

Enclosure top substrate 112 includes a cavity 120 for accepting a reservoir liner 122. The shape and depth of cavity 120 substantially corresponds to the thickness and shape of reservoir liner 122. Enclosure top substrate 112 also includes a clearance or cutout region 124 that allows access to certain input/output (I/O) pads 126 of droplet operations substrate 116. Enclosure top substrate 112 also includes one or more openings 128 for providing a fluid path to one or more reservoir electrodes of droplet operations substrate 116. Therefore, the locations of one or more openings 128 may substantially correspond to the locations of the reservoir electrodes.

Figure 3A:
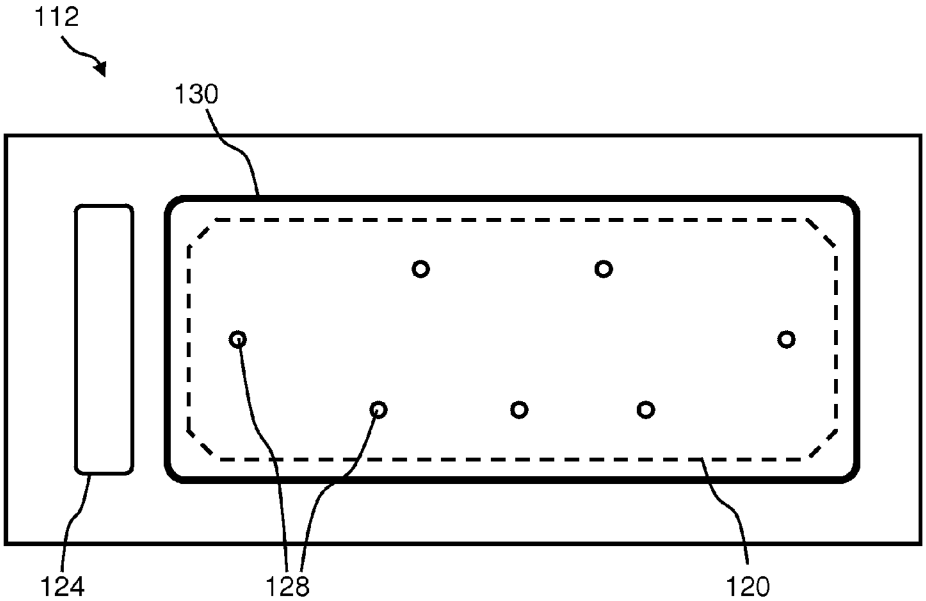
FIGS. 3A and 3B illustrate top and side views, respectively, of an example of the enclosure top substrate of the droplet actuator assembly of FIG. 1A.
Figure 3B:
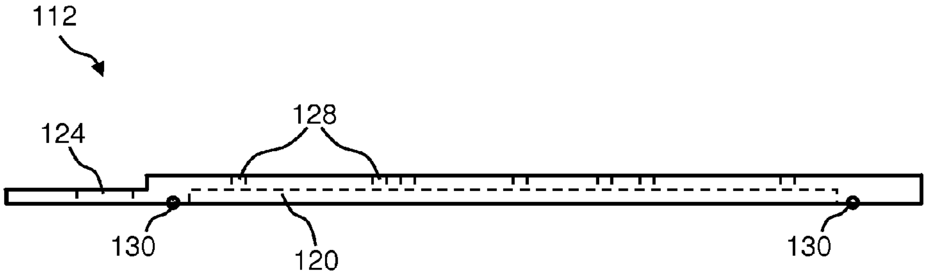

Enclosure top substrate 112 also includes a gasket 130. Gasket 130 may be formed by an insert molding (or overmolding) process that may be part of the injection molding process of forming enclosure top substrate 112. For example, gasket 130 may be formed of silicon or elastomer material. Gasket 130 surrounds the perimeter of reservoir liner 122 and is present to form a fluid seal between enclosure top substrate 112 and droplet operations substrate 116 when assembled, as shown in FIG. 1C. More details of enclosure top substrate 112 are shown in FIGS. 3A and 3B.

Figure 5A:
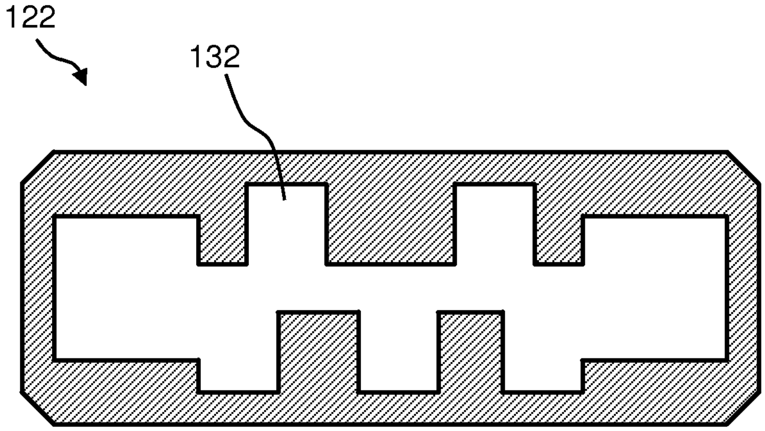
FIGS. 5A and 5B illustrate top and side views, respectively, of an example of the reservoir liner of the droplet actuator assembly of FIG. 1A.
Figure 5B:

Reservoir liner 122 may be formed, for example, by a material which may have similar optical properties as that of enclosure top substrate 112. Reservoir liner 122 also includes a clearance or cutout region 132 that is used to create fluid reservoir features in the gap 134 between enclosure top substrate 112 and droplet operations substrate 116 when assembled. The shape of cutout region 132 substantially corresponds to the footprint of electrode arrangement 118 of droplet operations substrate 116. Within the boundaries of cutout region 132 of reservoir liner 122, droplet operations are conducted atop the droplet operations electrodes on a droplet operations surface of droplet operations substrate 116. When droplet actuator assembly 100 is assembled, filler fluid, such as silicone oil, is present in gap 134. The filler fluid is sealed in gap 134 by gasket 130, as shown in FIG. 1C. Further, unless reservoir liner 122 is being used as a gap-setting component, an embodiment of droplet actuator assembly 100 need not include reservoir liner 122. However, without reservoir liner 122 more filler fluid is required to fill gap 134 between enclosure bottom substrate 110 and enclosure top substrate 112. More details of reservoir liner 122 are shown in FIGS. 5A and 5B.

Enclosure bottom substrate 110 and enclosure top substrate 112 form a two-piece shell type of enclosure for housing droplet operations substrate 116 and reservoir liner 122. Further, gap 134 of a certain uniform height is maintained between the inner surface of enclosure top substrate 112 and the droplet operations surface of droplet operations substrate 116. Enclosure bottom substrate 110 and enclosure top substrate 112 may be secured together by bonding, such as by an adhesive. Additionally, enclosure bottom substrate 110 and enclosure top substrate 112 may be secured together by an ultrasonic welding process. To facilitate the ultrasonic welding process Enclosure bottom substrate 110 may include an energy director feature 140. For example, energy director feature 140 may be a ridge or bump formed in a substantially continuous line around the perimeter of enclosure bottom substrate 110. FIG. 1A shows an example of the location of this continuous energy director feature 140, while FIG. 1B shows an example of the cross-sectional profile of energy director feature 140. In one example, the energy director feature 140 has an upside-down "V" shape, which is about 1 millimeter (mm) in width and about 1 mm in height.

During an ultrasonic welding process, ultrasonic energy is passed through enclosure top substrate 112 to energy director feature 140 of enclosure bottom substrate 110. When enclosure bottom substrate 110 and enclosure top substrate 112 are exposed to this ultrasonic energy, energy director feature 140 heats faster than the main mass of enclosure bottom substrate 110 and enclosure top substrate 112 and, therefore, energy director feature 140 melts. The melting action of energy director feature 140 creates a bond between enclosure bottom substrate 110 and enclosure top substrate 112 along and near the outside perimeter of droplet actuator assembly 100. In this way, droplet operations substrate 116, reservoir liner 122, and any other gap spacing features may be held between enclosure bottom substrate 110 and enclosure top substrate 112. During the ultrasonic welding process other features of enclosure bottom substrate 110, enclosure top substrate 112, droplet operations substrate 116, and reservoir liner 122 are not melted.

FIGS. 2A and 2B illustrate top and side views, respectively, of an example of enclosure bottom substrate 110 of droplet actuator assembly 100 of FIGS. 1A, 1B, and 1C. In these views, more details of, for example, cavity 114, and droplet operations substrate 116, and energy director feature 140 are shown.

FIGS. 3A and 3B illustrate top and side views, respectively, of an example of enclosure top substrate 112 of droplet actuator assembly 100 of FIGS. 1A, 1B, and 1C. In these views, more details of, for example, cavity 120, clearance or cutout region 124, openings 128, and gasket 130 are shown. Again, gasket 130 may be formed by an insert molding (or overmolding) process within the injection molding process of enclosure top substrate 112. Referring to FIG. 3B, the portion of enclosure top substrate 112 that includes clearance or cutout region 124 may be thinner than the portion of enclosure top substrate 112 that includes cavity 120.

FIGS. 4A and 4B illustrate top and side views, respectively, of an example of droplet operations substrate 116 of droplet actuator assembly 100 of FIGS. 1A, 1B, and 1C. In these views, more details of, for example, electrode arrangement 118 and I/O pads 126 that are patterned atop droplet operations substrate 116 are shown.

FIGS. 5A and 5B illustrate top and side views, respectively, of an example of the reservoir liner 122 of droplet actuator assembly 100 of FIGS. 1A, 1B, and 1C. In these views, more details of, for example, cutout region 132 are shown. Again, the shape of cutout region 132 substantially corresponds to the footprint of electrode arrangement 118 of droplet operations substrate 116.

Figure 6:
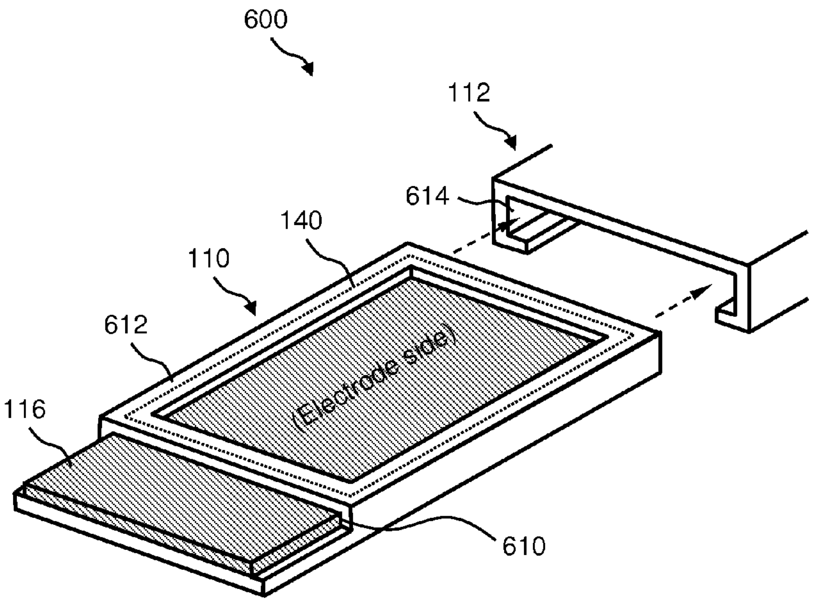
FIG. 6 illustrates a perspective view of another example of a droplet actuator assembly that is constructed using a gasketless two-piece enclosure design that may be ultrasonically welded.

FIG. 6 illustrates a perspective view of another example of a droplet actuator assembly 600 that is constructed using a gasketless two-piece enclosure design that may be ultrasonically welded. In this example, droplet actuator assembly 600 includes another embodiment of enclosure bottom substrate 110 and enclosure top substrate 112. In this embodiment, enclosure bottom substrate 110 has sidewalls with grooves or slots 610 incorporated therein for accepting, for example, droplet operations substrate 116, which may be a PCB. A lip 612 around the sidewalls of enclosure bottom substrate 110 forms a frame-like member and at the electrode side of droplet operations substrate 116. The energy director feature 140 may be formed on the outer surface of the frame-like member of enclosure bottom substrate 110. A gasket (not shown), such as gasket 130 of FIG. 1A, may be formed on the inner surface of the frame-like member of enclosure bottom substrate 110 for forming a fluid seal between enclosure bottom substrate 110 and droplet operations substrate 116.

In this embodiment, enclosure top substrate 112 has sidewalls with grooves or slots 614 incorporated therein for accepting enclosure bottom substrate 110 that has droplet operations substrate 116 installed therein. Further, although not shown, reservoir liner 122 may be present in droplet actuator assembly 600. When assembled, an ultrasonic welding process may be used to secure enclosure bottom substrate 110 to enclosure top substrate 112 via energy director feature 140.

Figure 7A:
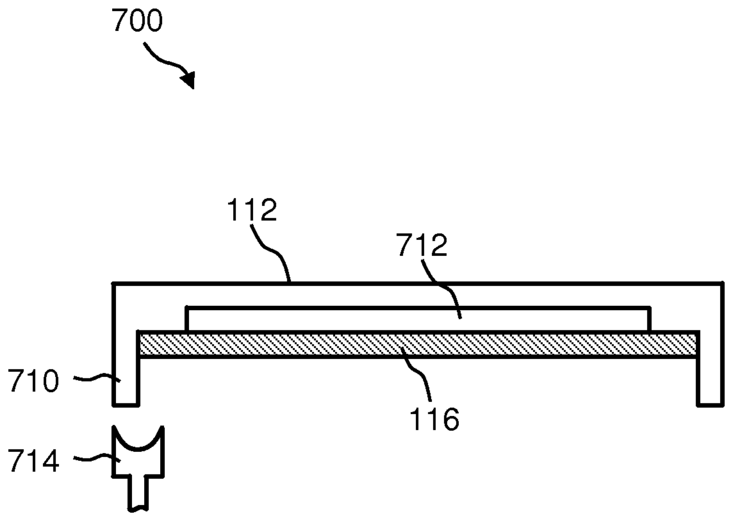
FIGS. 7A and 7B illustrate side views of an example of a droplet actuator assembly that is constructed using a gasketless one-piece enclosure design.
Figure 7B:
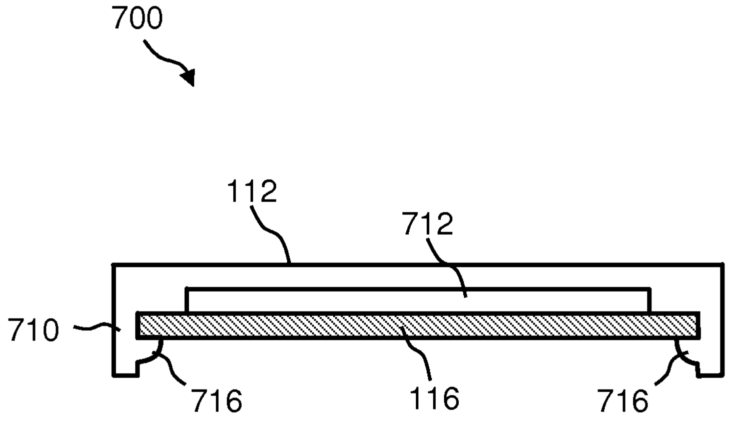

FIGS. 7A and 7B illustrate side views of an example of a droplet actuator assembly 700 that is constructed using a gasketless one-piece enclosure design. In this example, droplet actuator assembly 700 includes yet another embodiment of enclosure top substrate 112 that is used to house, for example, droplet operations substrate 116 without the use of enclosure bottom substrate 110. In this example, enclosure top substrate 112 includes sidewalls 710 between which droplet operations substrate 116 is fitted, as shown in FIG. 7A. Enclosure top substrate 112 also includes a cavity region 712 for forming a gap at the electrode side of droplet operations substrate 116 when installed. A crimping or swaging tool 714 may be used for crimping sidewalls 710 onto the edges of droplet operations substrate 116. Referring to FIG. 7B, a crimp 716 is shown securing the edges of droplet operations substrate 116. A gasket (not shown), such as gasket 130 of FIG. 1A, may be formed on the inner surface of enclosure top substrate 112 for forming a fluid seal between enclosure top substrate 112 and droplet operations substrate 116.

Figure 8:
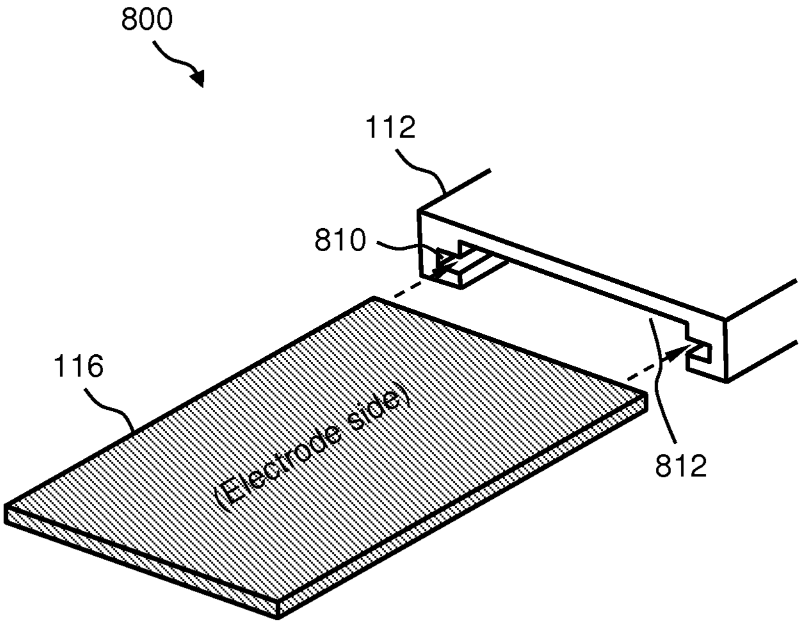
FIG. 8 illustrates a perspective view of another example of a droplet actuator assembly that is constructed using a gasketless one-piece enclosure design.

FIG. 8 illustrates a perspective view of another example of a droplet actuator assembly 800 that is constructed using a gasketless one-piece enclosure design. In this example, droplet actuator assembly 800 includes yet another embodiment of enclosure top substrate 112 that has sidewalls with grooves or slots 810 incorporated therein for accepting, for example, droplet operations substrate 116, which may be a PCB. Enclosure top substrate 112 also includes a cavity region 812 for forming a gap at the electrode side of droplet operations substrate 116 when installed. A gasket (not shown), such as gasket 130 of FIG. 1A, may be formed on the inner surface of enclosure top substrate 112 for forming a fluid seal between enclosure top substrate 112 and droplet operations substrate 116.

Figure 9:
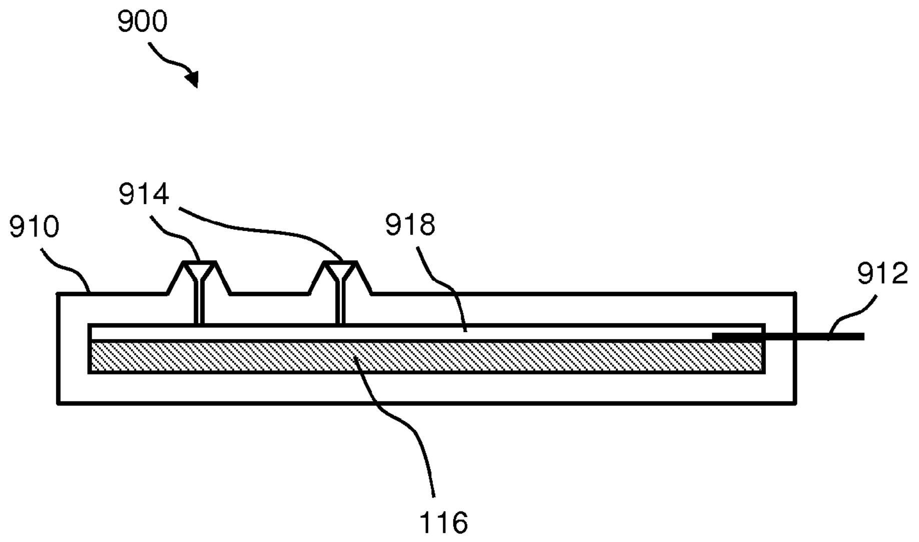
FIG. 9 illustrates a side view of yet another example of a droplet actuator assembly that is constructed using a gasketless one-piece enclosure design.

FIG. 9 illustrates a side view of yet another example of a droplet actuator assembly 900 that is constructed using a gasketless one-piece enclosure design. In this example, droplet actuator assembly 900 may include a one-piece enclosure substrate 910 for substantially completely enclosing, for example, droplet operations substrate 116, which may be a PCB. For example, droplet operations substrate 116 is completely encased using an insert molding (or overmolding) process within the injection molding process of one-piece enclosure substrate 910. No gasket material is needed because droplet operations substrate 116 is completely encased in one-piece enclosure substrate 910. Similar to enclosure bottom substrate 110 and enclosure top substrate 112 of previous embodiments, one-piece enclosure substrate 910 may be formed, for example, of PC, MDH12, COP, COC, and/or thermoplastic.

Droplet actuator assembly 900 may include flexible circuit material 912 that is also insert molded (or overmolded) into droplet actuator assembly 900 for supplying the electrical connections to droplet operations substrate 116. The portion of one-piece enclosure substrate 910 on the electrode side of droplet operations substrate 116 may include other features, such as, but not limited to, one or more fluid wells 914.

Certain raised spacer features (not shown) can be incorporated into droplet operations substrate 116 for holding the upper inner surface of one-piece enclosure substrate 910 away from the electrode side of droplet operations substrate 116, thereby setting the gap 918. Additionally, for creating a gap, in a first step of the insert molding (or overmolding) process, droplet operations substrate 116 may be pushed against the upper portion of one-piece enclosure substrate 910. Then after the upper portion is formed, droplet operations substrate 116 is retracted slightly (e.g., about 300 microns) and the lower portion of one-piece enclosure substrate 910 is injected. This is therefore a time sequenced process.

Figure 10:
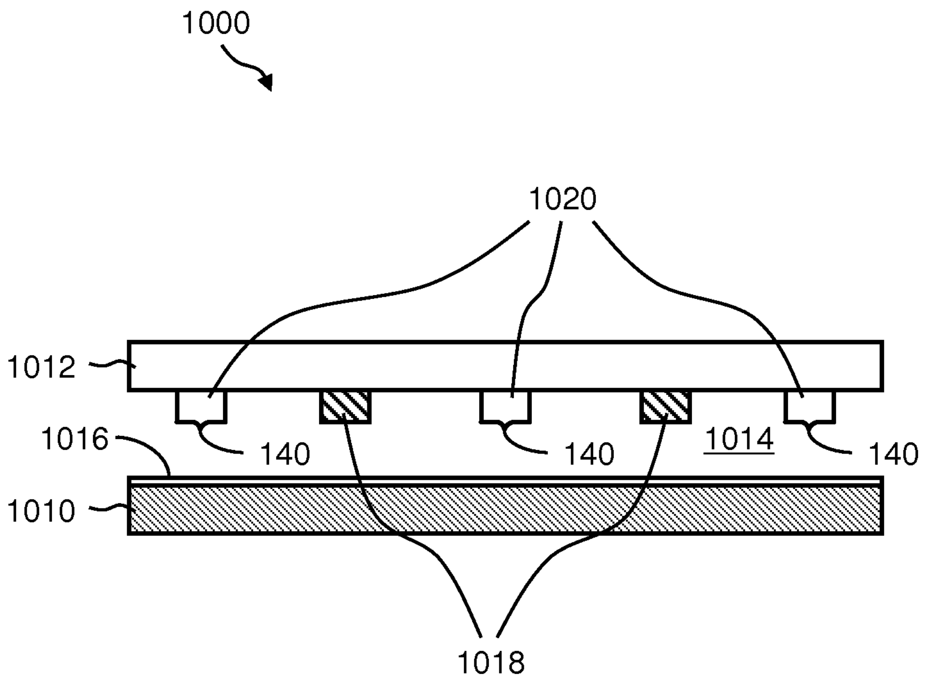
FIG. 10 illustrates a side view of an example of a droplet actuator that has features incorporated therein for allowing the substrates to be ultrasonically welded.

FIG. 10 illustrates a side view of an example of a droplet actuator 1000 that has features incorporated therein for allowing the substrates to be ultrasonically welded. Droplet actuator 1000 may include a droplet operations substrate 1010 and a top substrate 1012 that are separated by a gap 1014 when assembled. Droplet operations substrate 1010 may be a PCB. Top substrate 1012 may be formed, for example, of PC, MDH12, COP, COC, and/or thermoplastic. Droplet operations substrate 1010 may include an arrangement of droplet operations electrodes (not shown), such as electrowetting electrodes. Droplet operations are conducted atop the droplet operations electrodes on a droplet operations surface.

A main aspect of droplet actuator 1000 is that a sealed device may be formed without disturbing the gap-setting features. Further, a single process may be used to both set the gap height and seal the device.

A dielectric layer 1016 may be formed atop droplet operations substrate 1010. Dielectric layer 1016 may be formed, for example, of the same material as top substrate 1012. Gap-setting features 1018 are provided between droplet operations substrate 1010 and top substrate 1012. Additionally, one or more block-shaped features 1020 may be formed on the top substrate 1012, which have energy director features 140 formed thereon. In this way, top substrate 1012 may be ultrasonically welded to dielectric layer 1016 of droplet operations substrate 1010. Gap-setting features 1018 will not melt during the ultrasonic welding process.

Figure 11A:
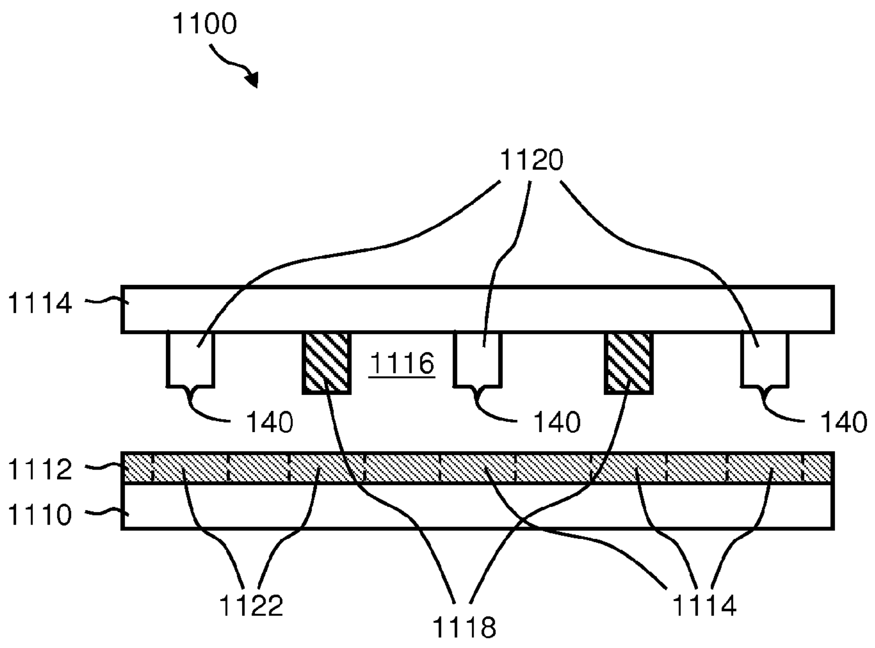
FIG. 11A illustrates a side view of another example of a droplet actuator that has features incorporated therein for allowing the substrates to be ultrasonically welded.

FIG. 11A illustrates a side view of another example of a droplet actuator 1100 that has features incorporated therein for allowing the substrates to be ultrasonically welded. Droplet actuator 1100 may include a bottom substrate 1110, a droplet operations substrate 1112 that is atop bottom substrate 1110, and a top substrate 1114. Droplet operations substrate 1112 and top substrate 1114 are separated by a gap 1116 when assembled. Droplet operations substrate 1112 may be a PCB. Bottom substrate 1110 and top substrate 1114 may be formed, for example, of PC, MDH12, COP, COC, and/or thermoplastic. Droplet operations substrate 1112 may include an arrangement of droplet operations electrodes (not shown), such as electrowetting electrodes. Droplet operations are conducted atop the droplet operations electrodes on a droplet operations surface.

Figure 11B:
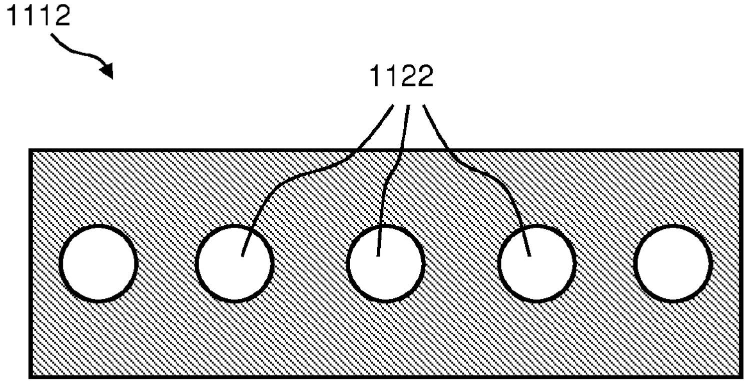
FIG. 11B illustrates a top view of the droplet operations substrate of the droplet actuator of FIG. 11A that has openings for accommodating the ultrasonic welding process.

Gap-setting features 1118 are provided between droplet operations substrate 1112 and top substrate 1114. Additionally, one or more block-shaped features 1120 may be formed on the top substrate 1114, which have energy director features 140 formed thereon. Openings 1122 are provided in droplet operations substrate 1112 that correspond to the positions of the one or more block-shaped features 1120. Openings 1122 allow the block-shaped features 1120 to pass through droplet operations substrate 1112 in order for energy director features 140 to make contact with bottom substrate 1110. In this way, top substrate 1114 may be ultrasonically welded to bottom substrate 1110. Gap-setting features 1118 will not melt during the ultrasonic welding process. FIG. 11B illustrates a top view of droplet operations substrate 1112 of droplet actuator 1100 that has openings 1122 for accommodating the ultrasonic welding process.

FIGS. 12A, 12B, and 12C illustrate views of another example of energy director features that may be incorporated in the droplet actuator assemblies of the present invention for facilitating the ultrasonic welding process. FIG. 12A shows a portion of a substrate 1200 that has an elongated energy director feature 1205 that is installed in a substantially continuous path along its edge. By contrast, FIG. 12B shows a portion of a substrate 1220 that has a series of short energy director features 1225 that is installed side-by-side in a substantially continuous path along its edge. The path of the side-by-side arrangement of energy director features 1225 substantially corresponds to the path of energy director feature 1205 of substrate 1200, when substrate 1200 and substrate 1220 are mated together. As shown in FIG. 12C, energy director features 1225 of substrate 1220 are orthogonally oriented with respect to the elongated energy director feature 1205 of substrate 1200.

A main aspect of the orthogonally oriented energy director features shown in FIGS. 12A, 12B, and 12C is that this arrangement provides a reliable (i.e., more permanent bond) liquid-proof seal using the ultrasonic welding process. For example, using this arrangement the use of a gasket, such as gasket 130 of FIG. 1A, to form a liquid seal between components may be avoided.

FIG. 13 illustrates a side view of an example of an ultrasonic welding system 1300 for welding substrates of droplet actuator assemblies. In this example, ultrasonic welding system 1300 may include a welding horn 1310 for imparting ultrasonic energy to a top plate 1312 for holding one of the substrates to be welded, such as enclosure top substrate 112 of FIGS. 1A, 1B, and 1C. Welding horn 1310 and top plate 1312 may be mounted on an elevated platform arrangement that may be adjustable in height. Ultrasonic welding system 1300 also includes a base plate 1314 for holding the other substrate to be welded, such as enclosure bottom substrate 110 of FIGS. 1A, 1B, and 1C.

In operation, using the adjustable height welding horn 1310 and top plate 1312, enclosure top substrate 112 is lowered into contact with enclosure bottom substrate 110 at base plate 1314. Welding horn 1310, which is the source of ultrasonic energy, is activated. In this way, ultrasonic energy is transferred to top plate 1312 and then to enclosure top substrate 112 and enclosure bottom substrate 110. Any energy director features, such as energy director features 140 that are present on either substrate or both substrates will absorb this energy and melt, thereby creating a bond between the two substrates.

FIG. 14 illustrates a side view of an example of a continuous reel-to-reel manufacturing process 1400 for forming droplet actuator assemblies. In particular, continuous reel-to-reel manufacturing process 1400 includes two processes that eventually merge into one process for forming the completed droplet actuator assemblies. For example, continuous reel-to-reel manufacturing process 1400 may include a first assembly line 1410 for processing a continuous sheet top substrate material, such as a continuous sheet of PC, MDH12, COP, COC, or thermoplastic material. Further, continuous reel-to-reel manufacturing process 1400 may include a second assembly line 1450 for processing a continuous sheet droplet operations substrate material, such as a continuous sheet of PCB material. These two processes eventually merge at an ultrasonic welding station for bonding together the two materials. More details of these processes are as follows.

First assembly line 1410 may include, for example, a continuous sheet of substrate material 1412, such as a continuous sheet of PC, MDH12, COP, COC, or thermoplastic material, which is supplied to the process via a payout spool 1414. The continuous sheet of substrate material 1412 rides along multiple tension isolation rollers 1416 (or conveyor idler rollers) that are arranged between payout spool 1414 and a take-up spool (not shown). Tension isolation rollers 1416 are used to maintain the proper position of and tension on the sheet of substrate material 1412. First assembly line 1410 may also include an embossing station 1418, followed by a Corona treatment station 1420, which is followed by a PEDOT treatment station 1422, which is followed by a heat cure station 1424, which is followed by a CYTOP™ treatment station 1426, which is followed by a heat cure station 1428.

Embossing station 1418 is used to conduct a process in which the continuous sheet of substrate material 1412 is roll embossed to create reservoir features, any gap-setting features, and/or any electrowetting features that are needed on both sides of the top substrate of a droplet actuator.

Corona treatment station 1420 is used to conduct a process in which the continuous sheet of substrate material 1412 is spray-coated with a Corona coating. The Corona treatment operation is used to assist adhesion in the PEDOT treatment process that follows.

PEDOT treatment station 1422 is used to conduct a process in which the continuous sheet of substrate material 1412 is spray-coated with PEDOT:PSS [or Poly(3,4-ethylenedioxythiophene) poly(styrenesulfonate)] material, which is a polymer mixture of two ionomers. PEDOT treatment station 1422 is follow by the heat cure station 1424 for performing a heat cure operation on the spray-coated PEDOT film.

CYTOP™ treatment station 1426 is used to conduct a process in which the continuous sheet of substrate material 1412 is spray-coated with CYTOP™ material, which may be a polymer solution dissolved with a special fluorinated solvent for thin-film coating. CYTOP™ treatment station 1426 is follow by the heat cure station 1428 for performing a heat cure operation on the spray-coated CYTOP™ film.

Second assembly line 1450 may include, for example, a continuous sheet of PCB material 1452, such as a continuous sheet of FR4 material, which is supplied to the process via a payout spool 1454. The continuous sheet of PCB material 1452 rides along multiple tension isolation rollers 1416 (or conveyor idler rollers) that are arranged between payout spool 1454 and a take-up spool (not shown). Again, tension isolation rollers 1416 are used to maintain the proper position of and tension on the sheet of PCB material 1452. Second assembly line 1450 may also include a Corona treatment station 1456, followed by a printing station 1458, which is followed by an ultraviolet (UV) cure station 1460.

Corona treatment station 1456 is used to conduct a process in which the continuous sheet of PCB material 1452 is spray-coated with a Corona coating. The Corona treatment operation is used to assist adhesion in the printing process that follows.

Printing station 1458 is used to conduct a process in which the continuous sheet of PCB material 1452 is printed with conductive traces, such as any type of conductive electrodes and/or any associated wiring, that are needed on both sides of the droplet operations substrate of a droplet actuator.

Printing station 1458 is follow by the UV cure station 1460 for performing a UV cure operation of the PCB material 1452.

Following the heat cure station 1428 of first assembly line 1410 and the UV cure station 1460 of second assembly line 1450, first assembly line 1410 and second assembly line 1450 merge at an ultrasonic welding station 1470. The motion of first assembly line 1410 and second assembly line 1450 is synchronized such that the features of the continuous sheet of substrate material 1412 and the features of the continuous sheet of PCB material 1452 are properly aligned. Therefore, at ultrasonic welding station 1470 any energy director features, such as energy director features 140 that are present on substrate material 1412 and/or PCB material 1452 absorb the ultrasonic energy that is supplied by ultrasonic welding station 1470. As a result, the energy director features are melted, thereby creating a bond between the two materials.

Following the ultrasonic welding station 1470 may be a cutting station 1472. Cutting station 1472 is used to cut any openings and/or slots that are desired in the finished droplet actuators. Cutting station 1472 is also used to cut to size the individual finished droplet actuators from the continuous sheet of material. In one example, continuous reel-to-reel manufacturing process 1400 is used to fabricate droplet actuators 1000 of FIG. 10. In this example, substrate material 1412 is a sheet of material to form top substrates 1012 and PCB material 1452 is a sheet of material to form droplet operations substrates 1010.

FIG. 15 illustrates a side view of an example of an ultrasonic stitch welding mechanism 1500 for use in a continuous reel-to-reel manufacturing process for forming droplet actuator assemblies. Ultrasonic stitch welding mechanism 1500 is an example of the ultrasonic welding station 1470 of continuous reel-to-reel manufacturing process 1400 of FIG. 14. Ultrasonic stitch welding mechanism 1500 may include a rotating sonotrode 1510 and an anvil roller 1512, which are arranged as shown in FIG. 15.

The ultrasonic welding process with respect to forming droplet actuator assemblies is not limited to the materials described with reference to FIGS. 1A through 15. Other types of materials may be suitable for ultrasonic welding processes in droplet actuator applications. FIG. 16 illustrates a matrix 1600 that shows various combinations of materials that may be ultrasonically welded in a droplet actuator application.

7.2 Other Processes Suitable for Droplet Actuator Applications

In another embodiment, the droplet actuator assemblies may be produced using, for example, a PC, MDH12, COP, COC, or thermoplastic top substrate that has cylindrical pegs that fit into holes located in the droplet operations substrate, which may be a PCB. Between the top substrate and PCB may be a rectangular frame of rubber material that acts as a pressure activated sealant. The production process may consist of compressing the top substrate into the PCB (with the rubber material in between) and then heat stamping the overhanging cylindrical pegs of the top substrate into the PCB. This process allows the rubber material to be pressure fit into the droplet actuator assembly and also allows the assembly to be liquid tight.

In yet another embodiment, magneto-rheological fluids (MRFs) are fluids that go through significant changes in viscosity upon application of a magnetic field. MRFs start as low viscosity liquids and turn into high viscosity gels and/or solids upon introduction of the magnetic field. However, MRFs return quickly (milliseconds) to a low viscosity state upon removal of the magnetic field. A small magnet may be embedded into the top substrate of a droplet actuator as a source of the magnetic field over a small sealing channel. Using droplet operations, an MRF droplet may be moved into position in the channel, at which the MRF droplet may harden into a sealing semi-solid in the presence of the magnetic field. Also present in close proximity to the droplet actuator (such as near the bottom substrate) is a counter magnet that serves to negate the magnetic field of the top substrate magnet. This allows the MRF droplet to return to a low viscosity state and be removed from the channel using droplet operations.

In yet another embodiment, heat and pressure are used to bond polymers of the top substrate to the underlying droplet operations substrate, which may be a PCB. This may be very useful for bonding differing materials that ultrasonic welding cannot bond. For example, this process may be used to bond the top substrate to the PCB or for sealing off a droplet actuator assembly using, for example, the two-piece and/or one-piece enclosure designs described with reference to FIGS. 1A through 15.

In yet another embodiment, polymer grafting, which uses techniques such as free radical graft polymerization, atom transfer radical polymerization, and plasma polymerization, may be used to bond dissimilar polymers. Therefore, polymer grafting may be suitable for creating seals in droplet actuator assemblies. For example, heat (e.g., at about 180° C.) may be used to melt PMMA and expose their anhydride groups for hydrogen bonding with polyamide.

In yet another embodiment, in a sealed design, conductive foam/rubber may be used as vias for communication with the contact pads of the droplet operations substrate, which may be a PCB. For example, the droplet actuator may be placed between two thermoplastic pieces (e.g., top and bottom substrate) and sealed through ultrasonic welding or any other means. The conductive foam/rubber acts as vias for communication with the PCB.

In still another embodiment, electrorheological or magnetorheological fluids may be used for creating software driven barriers and/or channels in droplet actuators. For example, electrorheological or magnetorheological fluids may be dispensed inside a droplet actuator and moved into place via droplet operations. A greater electric field or a magnetic field may be applied to turn the fluid into rigid components for barriers and channels.

7.3 Systems

Referring to FIGS. 1A through 16, it will be appreciated that various aspects of the invention may be embodied as a method, system, or computer program product. Aspects of the invention may take the form of hardware embodiments, software embodiments (including firmware, resident software, micro-code, etc.), or embodiments combining software and hardware aspects that may all generally be referred to herein as a “circuit,” “module” or “system.” Furthermore, the methods of the invention may take the form of a computer program product on a computer-usable storage medium having computer-usable program code embodied in the medium.

Any suitable computer useable medium may be utilized for software aspects of the invention. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include some or all of the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the invention may be written in an object oriented programming language such as Java, Smalltalk, C++ or the like. However, the computer program code for carrying out operations of the invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Certain aspects of invention are described with reference to various methods and method steps. It will be understood that each method step can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the methods.

The computer program instructions may also be stored in a computer-readable memory that can direct a computer or other programmable data processing apparatus to function in a particular manner, such that the instructions stored in the computer-readable memory produce an article of manufacture including instruction means which implement various aspects of the method steps.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing various functions/acts specified in the methods of the invention.

8 CONCLUDING REMARKS

The foregoing detailed description of embodiments refers to the accompanying drawings, which illustrate specific embodiments of the invention. Other embodiments having different structures and operations do not depart from the scope of the present invention. The term "the invention" or the like is used with reference to certain specific examples of the many alternative aspects or embodiments of the applicants' invention set forth in this specification, and neither its use nor its absence is intended to limit the scope of the applicants' invention or the scope of the claims. This specification is divided into sections for the convenience of the reader only. Headings should not be construed as limiting of the scope of the invention. The definitions are intended as a part of the description of the invention. It will be understood that various details of the present invention may be changed without departing from the scope of the present invention. Furthermore, the foregoing description is for the purpose of illustration only, and not for the purpose of limitation.

We claim:

1. A droplet actuator, comprising:

(a) a droplet operations substrate having droplet operations electrodes arranged on a side thereof and a top substrate separated by a gap when assembled;

(b) one or more gap setting features provided between the droplet operations substrate and the top substrate; and (c) one or more bonding features formed on the gap facing side of the top substrate.

2. The droplet actuator of claim 1 wherein the one or more bonding features comprise block-shaped features having energy director features formed thereon.

3. The droplet actuator of claim 1 wherein the droplet operations substrate comprises a PCB.

4. The droplet actuator of claim 1 wherein the top substrate comprises one of PC, MDH12, COP, COC, and/or thermoplastic.

5. The droplet actuator of claim 1 wherein the droplet operations electrodes comprise electrowetting electrodes.

6. The droplet actuator of claim 1 further comprising a dielectric layer formed on the droplet operations substrate.

7. The droplet actuator of claim 6 wherein the dielectric layer and the top substrate comprise the same material.

8. The droplet actuator of claim 1 wherein the top substrate is ultrasonically welded to the droplet operations substrate such that the gap-setting features do not melt during the ultrasonic welding process.

9. The droplet actuator of claim 1 further comprising a bottom substrate wherein the droplet operations substrate is atop the bottom substrate.

10. The droplet actuator of claim 9 wherein the bottom substrate comprises one of PC, MDH12, COP, COC, and/or thermoplastic.

11. The droplet actuator of claim 9 further comprising one or more openings in the droplet operations substrate that substantially correspond with the one or more bonding features such that the one or more bonding features pass through droplet operations substrate and make contact with the bottom substrate.

12. The droplet actuator of claim 11 wherein the top substrate is ultrasonically welded to the bottom substrate by the one or more bonding features.

* * * * *